(12) United States Patent
Rashid

(10) Patent No.: US 11,543,560 B2
(45) Date of Patent: Jan. 3, 2023

(54) METHOD FOR RESERVOIR SIMULATION OPTIMIZATION UNDER GEOLOGICAL UNCERTAINTY

(71) Applicant: Schlumberger Technology Corporation, Sugar Land, TX (US)

(72) Inventor: Kashif Rashid, Wayland, MA (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 17/047,131

(22) PCT Filed: Apr. 15, 2019

(86) PCT No.: PCT/US2019/027427
§ 371 (c)(1),
(2) Date: Oct. 13, 2020

(87) PCT Pub. No.: WO2019/200370
PCT Pub. Date: Oct. 17, 2019

(65) Prior Publication Data
US 2021/0199843 A1    Jul. 1, 2021

Related U.S. Application Data

(60) Provisional application No. 62/657,091, filed on Apr. 13, 2018.

(51) Int. Cl.
*G01V 99/00* (2009.01)
*G06F 30/20* (2020.01)
(Continued)

(52) U.S. Cl.
CPC ........... *G01V 99/005* (2013.01); *G06F 17/18* (2013.01); *G06F 30/20* (2020.01);
(Continued)

(58) Field of Classification Search
CPC .......... G01V 99/005; G01V 2210/624; G01V 2210/665; G06F 30/20; G06F 17/18; G06F 2111/08
(Continued)

(56) References Cited

U.S. PATENT DOCUMENTS

2014/0039859 A1    2/2014  Maucec et al.
2015/0267524 A1    9/2015  Embid Droz et al.
(Continued)

OTHER PUBLICATIONS

Inge Brandsaeter et al., Ranking of stochastic realizations of complex tidal reservoirs using streamline simulation criteria, Petroleum Geoscience, vol. 7 2001, pp. S53-S63. (Year: 2001).*
(Continued)

*Primary Examiner* — Kibrom K Gebresilassie

(57) ABSTRACT

A method, computer program product, and computing system are provided for receiving reservoir data associated with the reservoir. A simulation may be performed on the reservoir data to generate simulated reservoir data. A subset of realizations including a minimal number of realizations from a plurality of realizations may be determined based upon, at least in part, one or more statistical moments of the simulated reservoir data. An optimized reservoir model associated with an objective may be generated based upon, at least in part, the subset of realizations including the minimal number of realizations.

11 Claims, 23 Drawing Sheets

(51) Int. Cl.
  *G06F 17/18* (2006.01)
  *G06F 111/08* (2020.01)
(52) U.S. Cl.
  CPC .. *G01V 2210/624* (2013.01); *G01V 2210/665* (2013.01); *G06F 2111/08* (2020.01)
(58) Field of Classification Search
  USPC .......................................................... 703/6
  See application file for complete search history.

(56) References Cited

U.S. PATENT DOCUMENTS

| | | | |
|---|---|---|---|
| 2016/0162612 A1* | 6/2016 | Lukyanov | E21B 47/06 |
| | | | 703/2 |
| 2016/0326845 A1 | 7/2016 | Djikpesse | |
| 2017/0108617 A1 | 4/2017 | Fei et al. | |
| 2017/0335662 A1 | 11/2017 | Torrado et al. | |
| 2018/0188403 A1* | 7/2018 | Halsey | G01V 1/306 |
| 2020/0241167 A1* | 7/2020 | Bratvedt | E21B 49/00 |

OTHER PUBLICATIONS

Isapp, "Olympus Field Development Optimization Challenge", [http://www.isapp2.com/optimization-challenge.html], 2017, accessed Jan. 8, 2021, 4 pages.
International Search Report and Written Opinion of International Patent Application No. PCT/US2019/027427 dated Aug. 7, 2019, 11 pages.
Rashid, K., et al.. An Efficient Procedure for Expensive Reservoir-Simulation Optimization Under Uncertainty, SPE Econ. & Mgmt, 5, 4, Oct. 2013 (13 pages).

* cited by examiner

200 receiving, using one or more processors, reservoir data associated with a reservoir
200 selecting a plurality of random samples to simulate
208 performing the simulation on the reservoir data to generate the simulated reservoir data
202 determining the one or more statistical moments of the simulated reservoir data
210 determining a subset of realizations including a minimal number of realizations from a plurality of realizations based upon, at least in part, one or more statistical moments of the simulated reservoir data
204 generating an optimized reservoir model associated with an objective based upon, at least in part, the subset of realizations including the minimal number of realizations
206 using the optimized reservoir model to alter one or more operations at the reservoir
232 selecting a first subset of realizations from the plurality of realizations based upon, at least in part, the one or more statistical moments of the simulated reservoir data and a pre-defined number of realizations
212 optimizing a first set of one or more control variables to achieve the objective using the selected first subset of realizations
214 performing a first partial simulation on the reservoir data using the optimized first set of one or more control variables on the selected first subset of realizations
216 performing a first full simulation on the reservoir data using the optimized first set of one or more control variables on the plurality of realizations
218 determining whether a mismatch between simulation results associated with the first full simulation and simulation results associated with the first partial simulation are within a predefined threshold
220 incrementing the number of realizations
222 selecting a second subset of realizations from the plurality of realizations based upon, at least in part, the one or more statistical moments of the simulated reservoir data and the incremented number of realizations
224 optimizing the second set of one or more control variables for the simulation of the reservoir data using the selected second subset of realizations
226 performing a second partial simulation on the reservoir data using the optimized second set of one or more control variables and the selected second subset of realizations
228 performing a second full simulation on the reservoir data using the optimized second set of one or more control variables and the plurality of realizations
230

FIG. 2

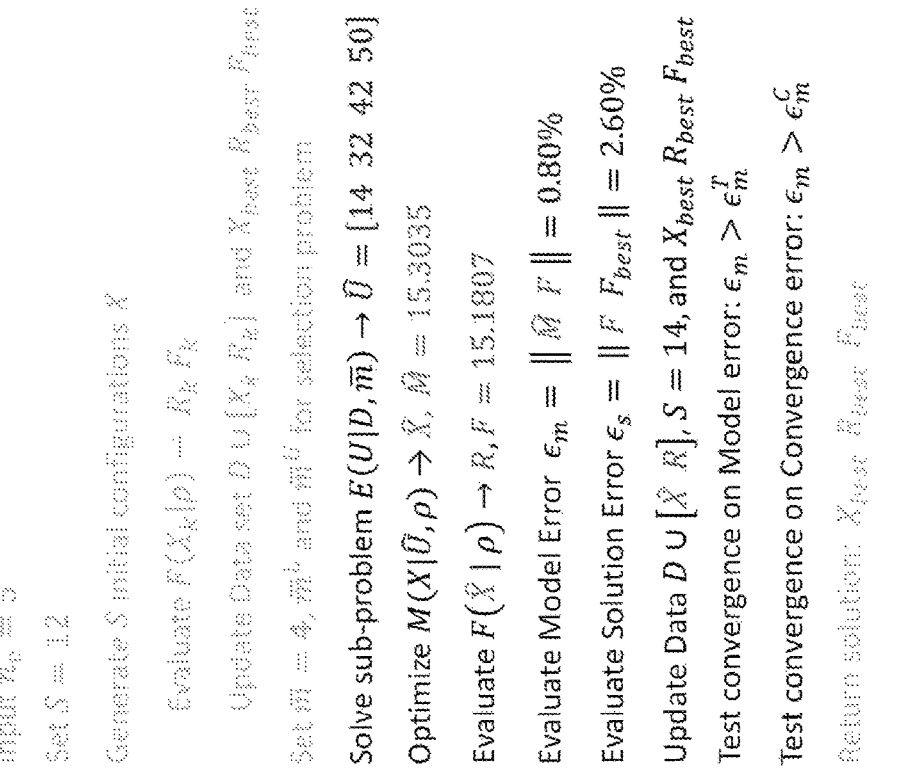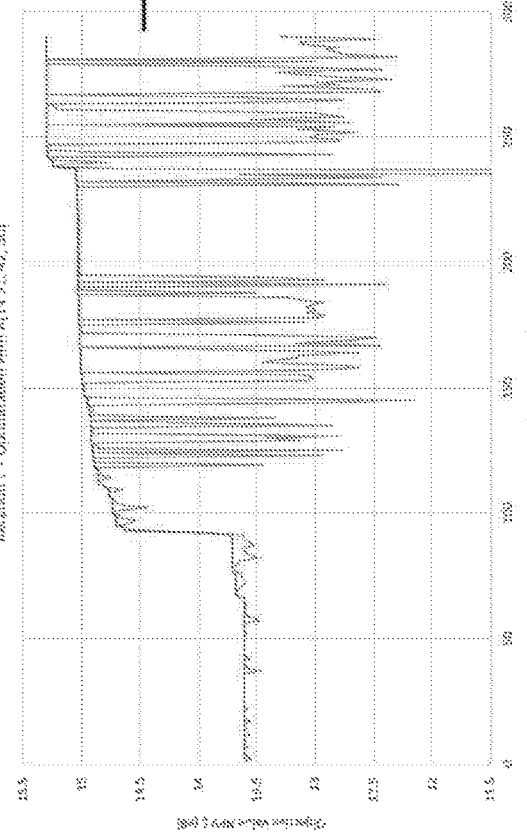
FIG. 10

Application

Iteration = 4

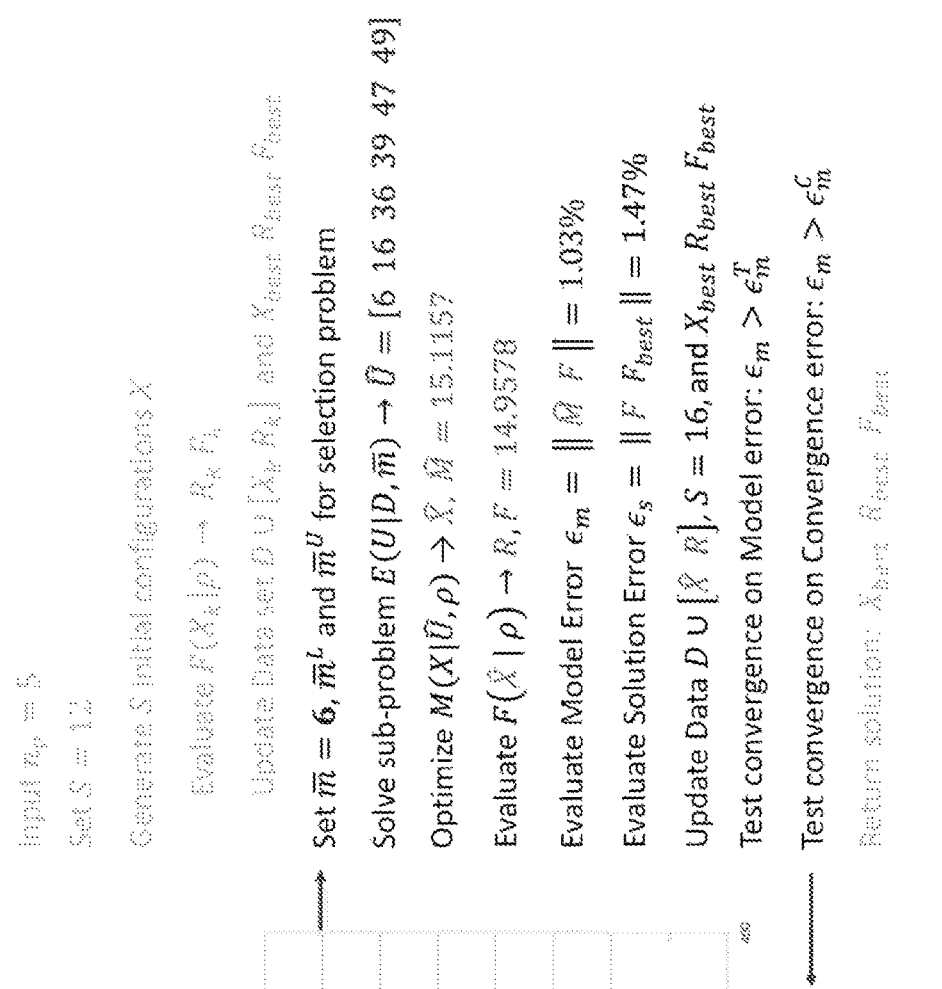

Input $n_o = 5$
Set $S = 12$
Generate $S$ initial configurations $X$
Evaluate $F(X_k|\rho) \to R_k P_k$
Update Data set $D \cup [X_k, R_k]$ and $X_{best} R_{best} F_{best}$ → Set $\overline{m} = 6, \overline{m}^L$ and $\overline{m}^U$ for selection problem
Solve sub-problem $E(U|D,\overline{m}) \to \tilde{U} = [6\ 16\ 36\ 39\ 47\ 49]$
Optimize $M(X|\tilde{U},\rho) \to \tilde{X}, \tilde{M} = 15.1157$
Evaluate $F(\tilde{X}|\rho) \to R, F = 14.9578$
Evaluate Model Error $\epsilon_m = \|\tilde{M}\ F\| = 1.03\%$
Evaluate Solution Error $\epsilon_s = \|F\ F_{best}\| = 1.47\%$
Update Data $D \cup [\tilde{X}\ R], S = 16$, and $X_{best}\ R_{best}\ F_{best}$
Test convergence on Model error: $\epsilon_m > \epsilon_m^T$
Test convergence on Convergence error: $\epsilon_m > \epsilon_m^C$
Return solution: $X_{best}\ R_{best}\ F_{best}$

FIG. 12

```
WCONPROD
  PROD-1   1* ORAT $CV1$  4* 150.0000 /
  PROD-2   1* ORAT $CV2$  4* 150.0000 /
  PROD-3   1* ORAT $CV3$  4* 150.0000 /
  PROD-4   1* ORAT $CV4$  4* 150.0000 /
  PROD-5   1* ORAT $CV5$  4* 150.0000 /
  PROD-6   1* ORAT $CV6$  4* 150.0000 /
  PROD-7   1* ORAT $CV7$  4* 150.0000 /
  PROD-8   1* ORAT $CV8$  4* 150.0000 /
  PROD-9   1* ORAT $CV9$  4* 150.0000 /
  PROD-10  1* ORAT $CV10$ 4* 150.0000 /
  PROD-11  1* ORAT $CV11$ 4* 150.0000 /
/
WCONINJE
  INJ-1 WATER 1* RATE $CV12$ 1* 235.0000 /
  INJ-2 WATER 1* RATE $CV13$ 1* 235.0000 /
  INJ-3 WATER 1* RATE $CV14$ 1* 235.0000 /
  INJ-4 WATER 1* RATE $CV15$ 1* 235.0000 /
  INJ-5 WATER 1* RATE $CV16$ 1* 235.0000 /
  INJ-6 WATER 1* RATE $CV17$ 1* 235.0000 /
  INJ-7 WATER 1* RATE $CV18$ 1* 235.0000 /
/
```

| Input | Units | Values |
|---|---|---|
| Well Oil Rate | sm3d | [10 900] |
| Injector Water Rate | sm3d | [10 1,600] |
| Max Platform Rate | sm3d | 14,000 |
| Produced oil value | $/bbl | 45 |
| Produced water cost | $/bbl | 6 |
| Injected water cost | $/bbl | 2 |
| Discount rate | % | 8 |
| Time period | yrs | 20 |

METHOD FOR RESERVOIR SIMULATION OPTIMIZATION UNDER GEOLOGICAL UNCERTAINTY

RELATED APPLICATION

This application claims the benefit of U.S. Provisional Application No. 62/657,091, filed on Apr. 13, 2018; the contents of which are incorporated herein by reference.

FIELD

This application relates to reservoir simulation and more particularly to optimizing reservoir simulations under geological uncertainty.

BACKGROUND

Operations, such as surveying, drilling, wireline testing, completions, production, planning and field analysis, are typically performed to locate and gather valuable downhole fluids such as those associated with oil fields and reservoirs. Surveys are performed using acquisition methodologies, such as seismic scanners or surveyors to obtain data about underground formations. During drilling and production operations, data is typically collected for analysis and/or monitoring of the operations. Such data may include, for instance, information regarding subterranean formations, information detailing how the drilling and/or production equipment are operating, information regarding the amount of fluid that is obtained or used, and/or other data. Typically, simulators use the gathered data to model specific behavior of discrete portions of the operations.

SUMMARY

In some embodiments, a method (e.g., a computer-implemented method) is executed on a computing device and may include but is not limited to receiving reservoir data associated with the reservoir. A simulation may be performed on the reservoir data to generate simulated reservoir data. A subset of realizations including a minimal number of realizations from a plurality of realizations may be determined based upon, at least in part, one or more statistical moments of the simulated reservoir data. An optimized reservoir model associated with an objective may be generated based upon, at least in part, the subset of realizations including the minimal number of realizations.

One or more of the following example features may be included. Determining the subset of realizations including the minimal number of realizations from the plurality of subsets of realizations may generally include: selecting a first subset of realizations from the plurality of realizations based upon, at least in part, the one or more statistical moments of the simulated reservoir data and a pre-defined number of realizations; optimizing a first set of one or more control variables to achieve the objective using the selected first subset of realizations; performing a first partial simulation on the reservoir data using the optimized first set of one or more control variables on the generated first subset of realizations; and performing a first full simulation on the reservoir data using the optimized first set of one or more control variables on the plurality of realizations; determining whether a mismatch between simulation results associated with the first full simulation and simulation results associated with the first partial simulation are within a predefined threshold. When the mismatch is determined to be within the predefined threshold: the number of realizations may be incremented; a second subset of realizations from the plurality of realizations may be selected based upon, at least in part, the one or more statistical moments of the simulated reservoir data and the incremented number of realizations; the second set of one or more control variables for the simulation of the reservoir data may be optimized using the selected second subset of realizations; a second partial simulation may be performed on the reservoir data using the optimized second set of one or more control variables on the selected second subset of realizations; a second full simulation may be performed on the reservoir data using the optimized second set of one or more control variables and the plurality of realizations; and may be repeated until a convergence condition is achieved. A plurality of random samples may be selected to simulate. The simulation may be performed on the reservoir data to generate the simulated reservoir data based upon, at least in part, the plurality of random samples. The one or more statistical moments of the simulated reservoir data may be determined. The one or more control variables may generally include one or more of a well liquid flow rate and an oil flow rate in the reservoir. The optimized reservoir model may be used to alter one or more operations at the reservoir. The one or more statistical moments of the simulated reservoir data may include one or more of a mean, a variance, and a standard deviation.

In another example implementation, a computing system may include one or more processors and one or more memories, wherein the computing system is configured to perform operations that may include but are not limited to receiving reservoir data associated with the reservoir. A simulation may be performed on the reservoir data to generate simulated reservoir data. A subset of realizations including a minimal number of realizations from a plurality of realizations may be determined based upon, at least in part, one or more statistical moments of the simulated reservoir data. An optimized reservoir model associated with an objective may be generated based upon, at least in part, the subset of realizations including the minimal number of realizations.

One or more of the following example features may be included. Determining the subset of realizations including the minimal number of realizations from the plurality of subsets of realizations may generally include: selecting a first subset of realizations from the plurality of realizations based upon, at least in part, the one or more statistical moments of the simulated reservoir data and a pre-defined number of realizations; optimizing a first set of one or more control variables to achieve the objective using the selected first subset of realizations; performing a first partial simulation on the reservoir data using the optimized first set of one or more control variables on the generated first subset of realizations; and performing a first full simulation on the reservoir data using the optimized first set of one or more control variables on the plurality of realizations; determining whether a mismatch between simulation results associated with the first full simulation and simulation results associated with the first partial simulation are within a predefined threshold. When the mismatch is determined to be within the predefined threshold: the number of realizations may be incremented; a second subset of realizations from the plurality of realizations may be selected based upon, at least in part, the one or more statistical moments of the simulated reservoir data and the incremented number of realizations; the second set of one or more control variables for the simulation of the reservoir data may be optimized using the selected second subset of realizations; a second partial simulation may be performed on the reservoir data using the optimized second set of one or more control variables on the selected second subset of realizations; a second full simulation may be performed on the reservoir data using the optimized second set of one or more control variables and the plurality of realizations; and may be repeated until a convergence condition is achieved. A plurality of random samples may be selected to simulate. The simulation may be performed on the reservoir data to generate the simulated reservoir data based upon, at least in part, the plurality of random samples. The one or more statistical moments of the simulated reservoir data may be determined. The one or more control variables may generally include one or more of a well liquid flow rate and an oil flow rate in the reservoir. The optimized reservoir model may be used to alter one or more operations at the reservoir. The one or more statistical moments of the simulated reservoir data may include one or more of a mean, a variance, and a standard deviation.

In yet another example implementation, a computer program product may include a non-transitory computer readable storage medium having a plurality of instructions stored thereon, which, when executed by a processor, cause the processor to perform operations including, but not limited to, receiving reservoir data associated with the reservoir. A simulation may be performed on the reservoir data to generate simulated reservoir data. A subset of realizations including a minimal number of realizations from a plurality of realizations may be determined based upon, at least in part, one or more statistical moments of the simulated reservoir data. An optimized reservoir model associated with an objective may be generated based upon, at least in part, the subset of realizations including the minimal number of realizations.

One or more of the following example features may be included. Determining the subset of realizations including the minimal number of realizations from the plurality of subsets of realizations may generally include: selecting a first subset of realizations from the plurality of realizations based upon, at least in part, the one or more statistical moments of the simulated reservoir data and a pre-defined number of realizations; optimizing a first set of one or more control variables to achieve the objective using the selected first subset of realizations; performing a first partial simulation on the reservoir data using the optimized first set of one or more control variables on the generated first subset of realizations; and performing a first full simulation on the reservoir data using the optimized first set of one or more control variables on the plurality of realizations. A mismatch may be determined between simulation results associated with the first full simulation and simulation results associated with the first partial simulation are within a predefined threshold. When the mismatch is determined to be within the predefined threshold: the number of realizations may be incremented; a second subset of realizations from the plurality of realizations may be selected based upon, at least in part, the one or more statistical moments of the simulated reservoir data and the incremented number of realizations; the second set of one or more control variables for the simulation of the reservoir data may be optimized using the selected second subset of realizations; a second partial simulation may be performed on the reservoir data using the optimized second set of one or more control variables on the selected second subset of realizations; a second full simulation may be performed on the reservoir data using the optimized second set of one or more control variables and the plurality of realizations; and may be repeated until a convergence condition is achieved. A plurality of random samples may be selected to simulate. The simulation may be performed on the reservoir data to generate the simulated reservoir data based upon, at least in part, the plurality of random samples. The one or more statistical moments of the simulated reservoir data may be determined. The one or more control variables may generally include one or more of a well liquid flow rate and an oil flow rate in the reservoir. The optimized reservoir model may be used to alter one or more operations at the reservoir. The one or more statistical moments of the simulated reservoir data may include one or more of a mean, a variance, and a standard deviation.

This summary is provided to introduce a selection of concepts that are further described below in the detailed description. This summary is not intended to identify essential features of the claimed subject matter, nor is it intended to be used as an aid in limiting the scope of the claimed subject matter.

BRIEF DESCRIPTION OF THE DRAWINGS

The present invention is illustrated by way of example, and not limitation, in the figures of the accompanying drawings in which like references indicate similar elements and in which:

FIG. 2 illustrates a flowchart showing operations consistent with embodiments of the present disclosure;

FIGS. 9-16 illustrate an example of simulation optimization consistent with embodiments of the present disclosure;

FIG. 17 illustrates an example of simulation values consistent with embodiments of the present disclosure.

DETAILED DESCRIPTION

The discussion below is directed to certain implementations and/or embodiments. It is to be understood that the discussion below may be used for the purpose of enabling a person with ordinary skill in the art to make and use any subject matter defined now or later by the patent "claims" found in any issued patent herein.

It is specifically intended that the claimed combinations of features not be limited to the implementations and illustrations contained herein but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms may be used to distinguish one element from another. For example, a first object or step could be termed a second object or step, and, similarly, a second object or step could be termed a first object or step, without departing from the scope of the disclosure. The first object or step, and the second object or step, are both objects or steps, respectively, but they are not to be considered a same object or step.

Figure 1:
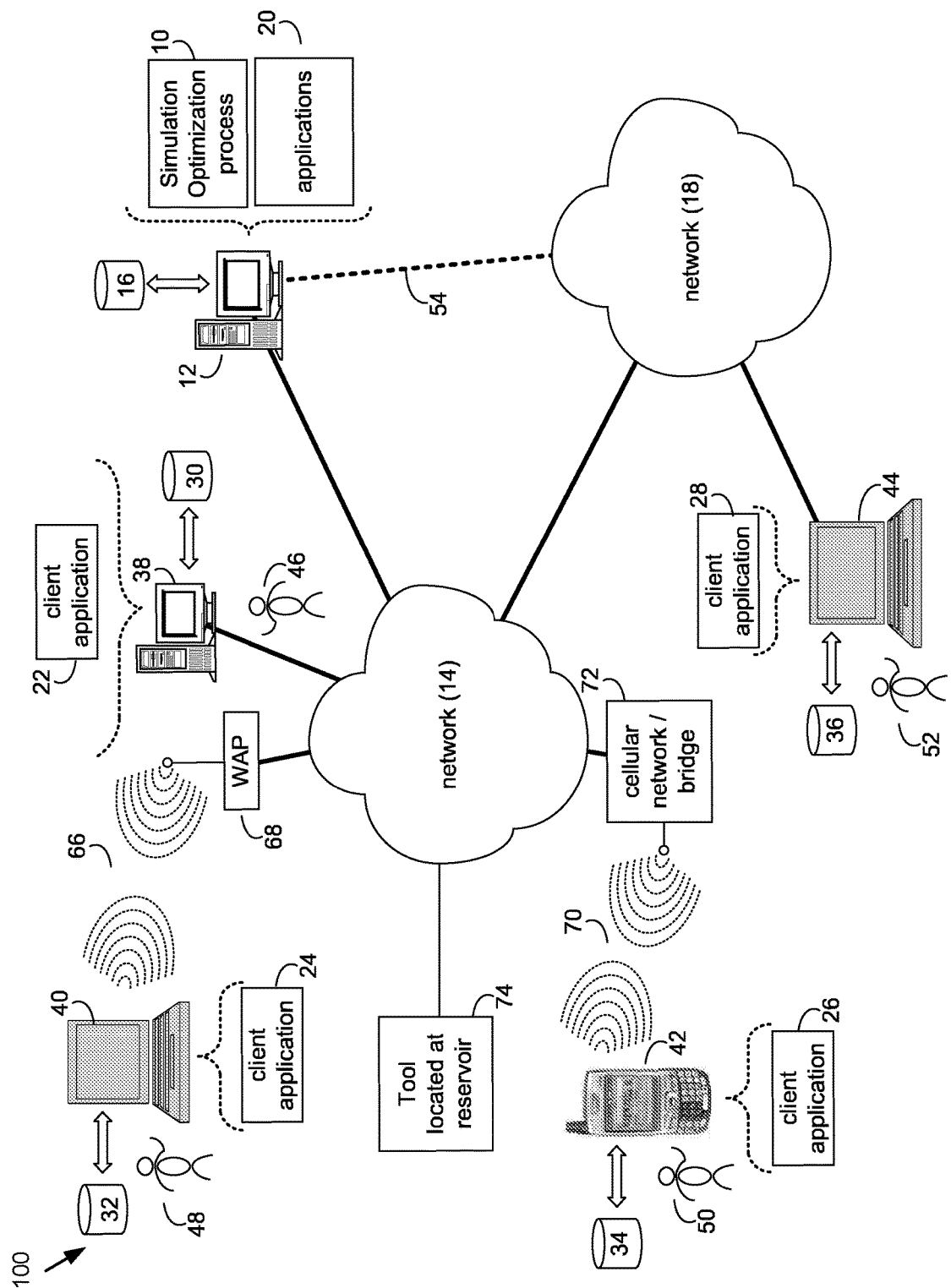
FIG. 1 illustrates a block diagram of an exemplary system for a simulation optimization process in accordance with embodiments of the present disclosure.

Referring to FIG. 1, there is shown a simulation optimization process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Simulation optimization process 10 may reside on and be executed, in whole or in part, by a client electronic device, such as a personal computer, notebook computer, personal digital assistant, or the like.

The instruction sets and subroutines of simulation optimization process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid-state drive, a tape drive; an optical drive; a RAID array; a random access memory (RAM); and a read-only memory (ROM). Storage device 16 may include various types of files and file types.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Simulation optimization process 10 may be a stand-alone application or may be an applet/application/script that may interact with and/or be executed within application 20. In addition, or as an alternative to being a server-side process, simulation optimization process 10 may be a client-side process (not shown) that may reside on a client electronic device (described below) and may interact with a client application (e.g., one or more of client applications 22, 24, 26, 28). Further, simulation optimization process 10 may be a hybrid server-side/client-side process that may interact with application 20 and a client application (e.g., one or more of client applications 22, 24, 26, 28). As such, simulation optimization process 10 may reside, in whole, or in part, on server computer 12 and/or one or more client electronic devices.

The instruction sets and subroutines of application 20, which may be stored on storage device 16 coupled to server computer 12 may be executed by one or more processors (not shown) and one or more memory modules (not shown) incorporated into server computer 12.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage device. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access simulation optimization process 10.

Users 46, 48, 50, 52 may access simulation optimization process 10 and/or other applications associated with server computer 12 directly through the device on which the client application (e.g., client applications 22, 24, 26, 28) is executed, namely client electronic devices 38, 40, 42, 44, for example. Users 46, 48, 50, 52 may access process 10 and/or other applications directly through network 14 or through secondary network 18. Further, server computer 12 (i.e., the computer that executes these applications) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that can establish wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or another suitable operating system. (Windows CE is a registered trademark of Microsoft Corporation in the United States, other countries, or both).

In some embodiments, simulation optimization process 10 may generate an output that may be delivered to one or more onsite tools such as reservoir tool 74. Reservoir tool 74 may include, but is not limited to, those available from the Assignee of the present disclosure. In some embodiments, reservoir tool 74 may include one or more processors configured to receive an output from simulation optimization process 10 and alter the operations of reservoir tool 74.

Embodiments included herein are directed towards a method designed to manage geological reservoir uncertainty during expensive simulation optimization. For example, the uncertainty associated with geological reservoir may be represented in the form of geological realizations that may or may not be equi-probable. As will be discussed in greater detail below, an optimization process is developed in which, for a given amount of data from a full system including a plurality of realizations, the least number of realizations that are representative of some statistical measure are identified. That is, a subset of realizations may be defined that capture one or more moments of an underlying distribution represented by the set of all possible realizations.

Referring to the examples of FIGS. 1-23, embodiments of the present disclosure may help to address the computational expense in time associated with modeling reservoirs to achieve a particular objective. For example, consider the operations of an existing reservoir with a number of producers and injectors. In the context of reservoirs, a producer may generally refer to a "sink" of fluid in a reservoir and an injector may generally refer to a "source" of fluid in a reservoir. In some embodiments, various control or operating parameters associated with producers and injectors may be adjusted which may impact the operation of the reservoir. In some embodiments, petrochemical engineers may desire to know how to achieve a particular objective associated with the reservoir. For example, an objective may relate to maximizing the net present value (NPV) of a reservoir.

To accomplish this objective, various operations may be adjusted including, for example purposes only, the well liquid flow rate, the oil flow rate, etc. Unfortunately, the ability to accurately predict or simulate a reservoir may be dependent upon a number of geological realizations associated with the reservoir. A geological realization may generally include a model generated using geological and petrophysical properties to capture the range of possible geologic variability presented in the reservoir. As will be discussed in greater detail below, reservoir dynamic modeling or reservoir simulation may be conducted to identify the range of uncertainties in the geological realizations through fluid rates, volumes, and recovery factors. As such, the more realizations available when simulating a reservoir and/or attempting to achieve a particular objective using a reservoir model, the more accurate the results may be. In this example, the results of simulating the reservoir using a plurality of realizations may determine which operations or controls to adjust to achieve the objective. In the example of maximizing NPV, the well liquid and/or oil flow rates may be determined from the reservoir model to achieve the maximum NPV. However, modeling a plurality of realizations may be prohibitively expensive in terms of the amount of computing resources and/or time required. For example, a single simulation involving a single realization (e.g., an evaluation) may take approximately seven minutes. With a group of e.g., 50 realizations, modeling a single objective over the e.g., 50 realizations may take e.g., approximately six hours. As will be discussed in greater detail below, embodiments of the present disclosure may allow a computer to more efficiently model a reservoir for a particular objective using a subset of realizations with a minimal number of realizations without sacrificing accuracy. In this manner, the operations of a computer while modeling or simulating a reservoir may be improved by the present disclosure. Furthermore, the operations of a reservoir may be adjusted more quickly than possible with full system modeling using all realizations. As such, the operations and efficiency of a reservoir may be improved by embodiments of the present disclosure.

In some embodiments, and referring also to FIG. 2, simulation optimization process 10 may generally include receiving reservoir data 200 associated with the reservoir. A simulation may be performed 202 on the reservoir data to generate simulated reservoir data. A subset of realizations including a minimal number of realizations from a plurality of realizations may be determined 204 based upon, at least in part, one or more statistical moments of the simulated reservoir data. An optimized reservoir model associated with an objective may be generated 206 based upon, at least in part, the subset of realizations including the minimal number of realizations.

In some embodiments, reservoir data associated with a reservoir may be received 200. In some embodiments, a plurality of realizations may be received 200. In some embodiments, realizations may generally include plausible scenarios of a sub-surface that are generated under different constraints or parameters. For example, stochastic-modeling methods may provide many plausible images of the reservoir (e.g., realizations). Realizations may be generated as the result of sampling the uncertainty by changing only certain parameters from simulation to simulation. In some embodiments, individual simulation scenarios can have multiple realizations with the possibility of generating hundreds of models that honor the available data of a reservoir. In some embodiments, pre-existing or previously defined realizations representative of the reservoir may be received 200. For example, a plurality of realizations may be provided by geoscientists. As discussed above and in some embodiments, the reservoir may include one or more producers and one or more injectors. As known in the art, producers and injectors may provide variable flow rates of liquid and/or oil during the operation of the reservoir. In some embodiments, reservoir data may include data associated with the one or more producers and the one or more injectors. In this manner, the geological uncertainty associated with a reservoir may be represented by a plurality of realizations and a reservoir simulation model. As will be discussed in greater detail below, the reservoir simulation model may include all data necessary to describe the reservoir (e.g., petrophysical properties extracted from cores, log data, measurements, etc.). Accordingly, simulation optimization process 10 may address the computational aspect of simulating and optimizing a reservoir model under geological uncertainty.

Figure 3:
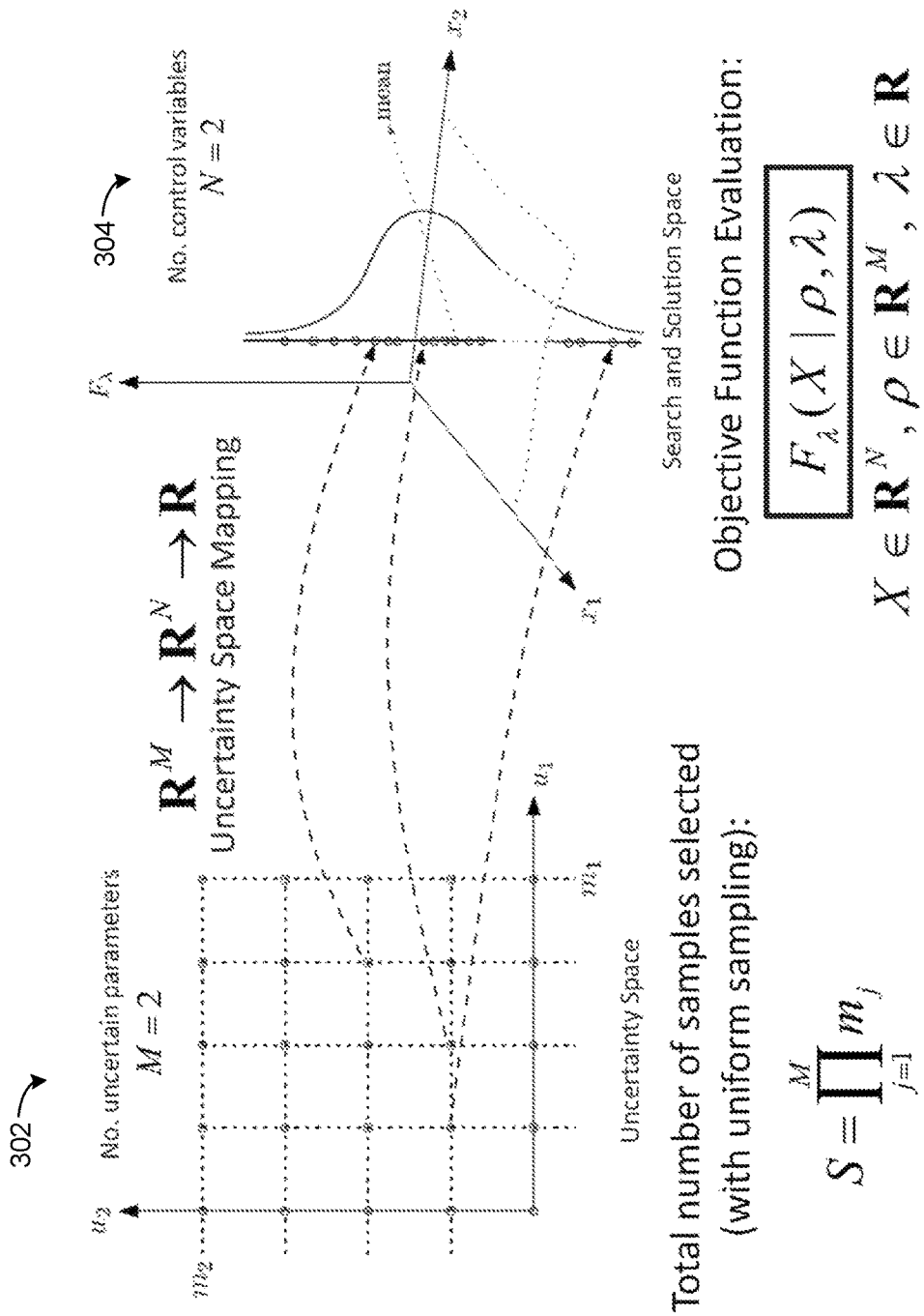
FIG. 3 illustrates an example of mapping samples from an uncertain space to a search and solution space consistent with embodiments of the present disclosure.

In some embodiments, a simulation may be performed 202 on the reservoir data to generate simulated reservoir data. In some embodiments, reservoir dynamic modeling or reservoir simulation may be run or performed 202 to identify a range of uncertainties in the geological realizations through fluid rates, volumes, and/or recovery factors. For example, a number of initial samples, S, may be established. The number of initial samples may be user-defined and/or a pre-defined value. In some embodiments, a plurality of random samples (e.g., S random samples) may be selected 208 over a search space. For example, and referring also to the example of FIG. 3, random samples from an uncertainty space (e.g., uncertainty space 302) may be mapped to a search space (e.g., search space 304). For example, uncertainty space 302 may define a space for M uncertain parameters (e.g., $\mathbb{R}^M$) in a problem and search space 304 may include an N-dimensionality (e.g., $\mathbb{R}^N$). As shown in FIG. 3, a two-dimensional uncertainty space (e.g., uncertainty space 302) may be mapped to a two-dimensional search space (e.g., search space 304) with functional values yielding a distribution. In this example, the plurality of samples may be selected 208 from search space 304. In some embodiments, the uncertainty of reservoir may be discrete so any samples in the uncertainty space (e.g., uncertainty space 302) may already be known in the form of realizations. However, it will be appreciated that continuous uncertain parameters may be included within the scope of the present disclosure.

In some embodiments, an objective function evaluation may be defined as shown in Equation 1:

$$F_\lambda(X|p,\lambda) \quad (1)$$

where: $X \in \mathbb{R}^N, \rho \in \mathbb{R}^M, \lambda \in \mathbb{R}$

Figure 4:
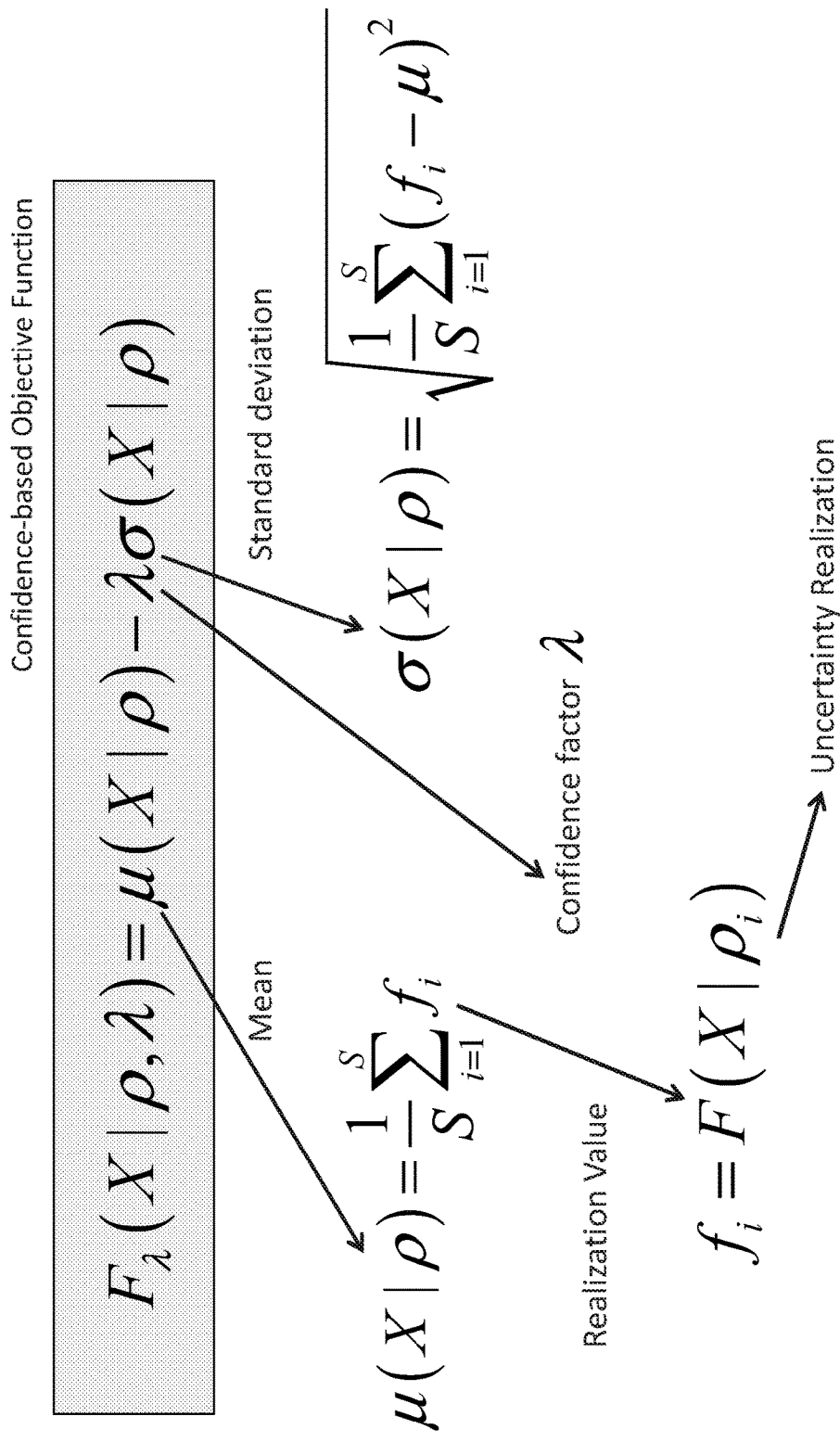
FIG. 4 illustrates an example confidence-based objective function consistent with embodiments of the present disclosure.
Figure 5:
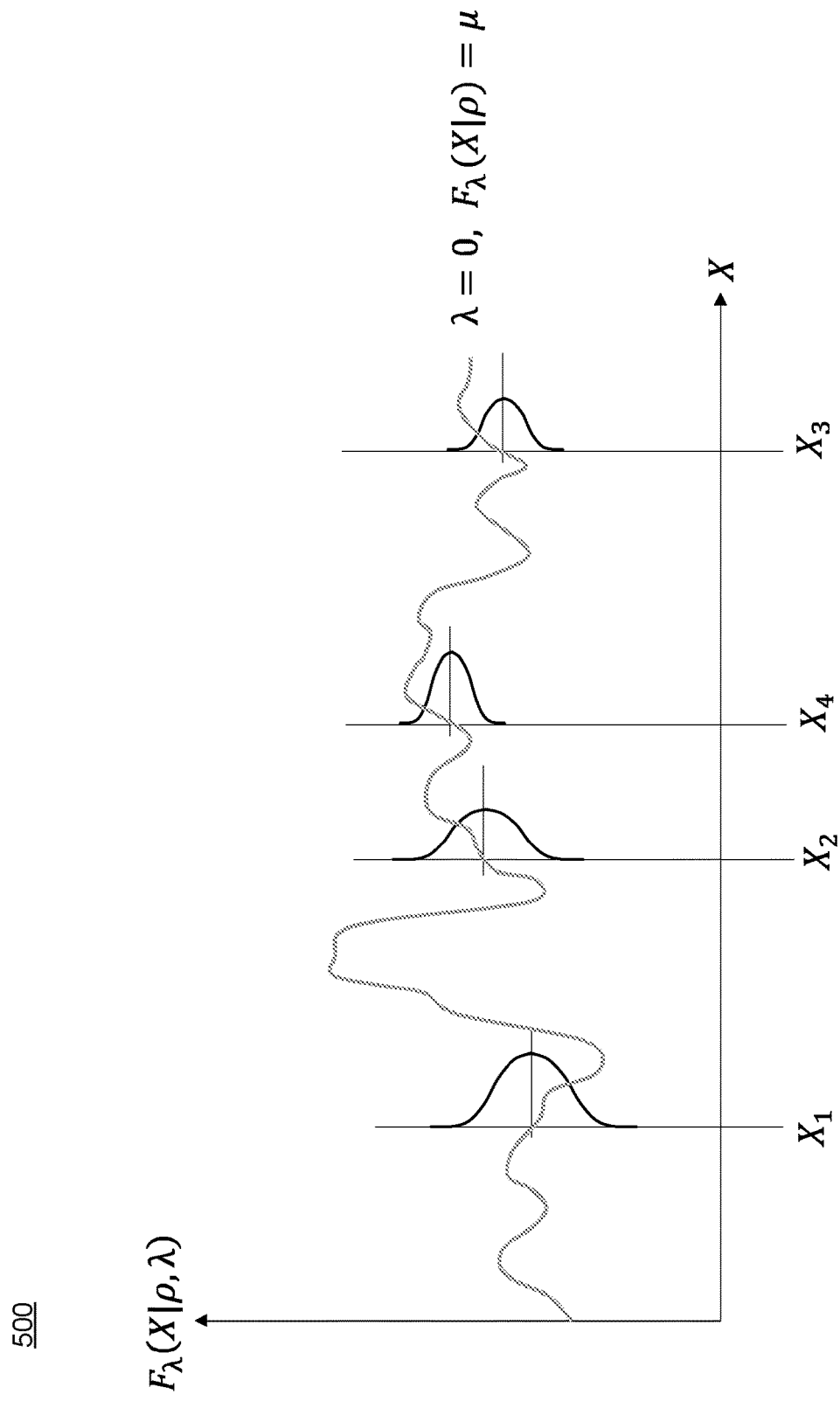
FIG. 5 illustrates an example representation of an objective function as a product of distributions associated with various samples consistent with embodiments of the present disclosure.

Referring also to FIG. 4 and in some embodiments, a confidence-based objective function is shown as a function of one or more statistical moments of the simulated reservoir data. A statistical moment may generally include characteristics of data that may be used to classify the data in its entirety. For example, a mean and a standard deviation may be statistical moments that may classify a domain of distributions. As shown in FIG. 4, the objective function of Equation 1 may be defined or classified based upon one or more statistical moments (e.g., the mean and standard deviation) as shown in Equation 2:

$$F_\lambda(X|p,\lambda) = \mu(X|\rho) - \lambda \sigma(X|\rho) \quad (2)$$

where: $\mu(X|\rho)$ is the mean;
$\sigma(X|\rho)$ is the standard deviation; and
$\lambda$ is the confidence factor.

The mean may be defined as shown in Equation 3 below and the standard deviation may be defined as shown in Equation 4 below:

$$\mu(X|\rho) = \frac{1}{s}\sum_{i=1}^{s} f_i \quad (3)$$

$$\sigma(X|\rho) = \sqrt{\frac{1}{s}\sum_{i=1}^{s}(f_i - \mu)^2} \quad (4)$$

The mean of Equation 3 may be a function of a realization value as shown in Equation 5 below:

$$f_i = F(X|\rho_i) \quad (5)$$

where: $\rho_i$ is an uncertainty realization.

As can be seen from Equations 3-5, a sufficient number of samples, S, may be desired to provide an accurate estimation of the mean and variance, as each of the mean and variance are dependent upon the number of samples.

In some embodiments, performing 202 the simulation on the reservoir data to generate the simulated reservoir data may be based upon, at least in part, the plurality of random samples. For example, simulation optimization process 10 may establish an actual simulation response as shown below in Equation 6:

$$R_{kj} = F(X_k|\rho) \quad (6)$$

where: $k \in [1 \ S]$;
$j \in [1 \ m]$;
$X \in \mathbb{R}^n$;
$\rho \in \mathbb{R}^m$;
$n = (n_p, +n_i)n_v$;
$n_v \in [1 \ T/q]$; and
$x_i^L \le x_i \le x_i^U$, $i \in [1 \ n]$ In some embodiments, F, may be a functional simulation evaluation (e.g., the objective), X may be a set of control variables from [1 n] (e.g., well liquid flow rate and/or oil flow rate), p may be a set of realizations [1 m], n may indicate the problem dimensionality (e.g., the number of control variables), m may be a total number of realizations of a plurality of realizations, S may be a number of samples, $n_p$ may be a number of producers, $n_i$ may be a number of injectors, $n_v$ may be a number of temporal partitions, T may be a time period of interest (years), q may be a minimum time interval (years), and $x_i$ may be the i-th variable with bounds $[x_i^L \ x_i^U]$.

In some embodiments, performing 202 the simulation on the reservoir data to generate simulated reservoir data may generate a simulation response for a set of control variables X for the S randomly selected samples. For example, and referring also to the example of FIG. 5, each of design configurations $X_1, X_2, X_3$, and $X_4$ may furnish a distribution. In some embodiments, the domain $F_\lambda(X|p, \lambda)$ may be classified in general with the S randomly selected design configurations samples (e.g., the samples taken in the search space; $X_1, X_2, X_3$, and $X_4$). As discussed above, the number of samples may be determined to provide an accurate estimation of the mean and variance, as each of the mean and variance are based upon, at least in part, the number of samples. In some embodiments and as shown in Equation 6, the set of control variables X for the S randomly selected samples in the search space may be simulated across the plurality of realizations to generate $R_{kj}$.

In some embodiments, D may represent the S known data points in tabular form as shown below in Equation 7:

$$D = [XR]_S \quad (7)$$

where: $D \in R^{S \times (n+m)}$

In some embodiments, one or more statistical moments of the simulated reservoir data may be determined 212. For example, the mean of the set of m realizations may be determined 212 as shown in Equation 8 below:

$$\mu_k(R_k) = \frac{1}{m}\sum_{j=1}^{m} R_{kj} \quad (8)$$

In some embodiments, the standard deviation of the set of m realizations may be determined 212 as shown in Equation 9 below:

$$\sigma_k(R_k) = \sqrt{\frac{1}{m}\sum_{j=1}^{m}(\mu_k - R_k)^2} \quad (9)$$

In some embodiments, the utility-based objective may be determined as shown in Equation 10 below:

$$f_k = \mu_k - \sigma_k \gamma = F(X_k|\rho) \quad (10)$$

In some embodiments, a subset of realizations including a minimal number of realizations from a plurality of realizations may be determined 204 based upon, at least in part, one or more statistical moments of the simulated reservoir data. As discussed above, conventional simulation approaches generally include optimizing the set of control variables X for each sample across each realization of the plurality of realizations. In an example where the number of samples S is e.g., 12 and the plurality of realizations, $\rho$, is e.g., 50, the simulation time may be approximately e.g., six hours for each objective. In some embodiments of the present disclosure, the objective or problem may be compactly defined for any subset of realizations as shown below in Equation 11:

$$M(X|U,\rho) = M(X|\beta) = M(X|\bar{\rho}) \quad (11)$$

where: $X \in \mathbb{R}^n$;
$\rho \in \mathbb{R}^m$;
$\bar{\rho} \in \mathbb{R}^{\bar{m}}$;
$n = (n_p + n_i)n_v$;
$n_v \in [1 \ T/q]$;
$\bar{m} = \sum_{j=1}^{m} U_j$;
$\beta_j = U_j \rho_j$;
$U_j = \{0,1\}$; and
$j \in [1 \ M]$.

In some embodiments, $\bar{\rho}$ may be a set of realizations $[1 \ \bar{m}]$, $\bar{m}$, may be a total number of realizations of a plurality of realizations, U may be a set of selected realizations $[1 \ m]$, and $\beta_j$ may define an active realization with $U_j = \{0,1\}$ and $j \in [1 \ m]$.

In this manner, the realization selection problem may be posed as a nonlinear binary optimization problem and, as will be discussed in greater detail below, the solution of which may be used to set the reduced order model comprising the least number (i.e., a minimal number) of realizations. In some embodiments, simulation optimization process 10 may determine one or more statistical moments 210 as show below in Equations 12-20:

$$E(U|D) = \varepsilon_\mu + \varepsilon_\sigma \quad (12)$$

$$\varepsilon_\mu = \|\mu(R) \ \bar{\mu}(R_lU)\| \quad (13)$$

$$\varepsilon_\sigma = \|\sigma(R) \ \bar{\sigma}(R,U)\| \quad (14)$$

$$\varepsilon_\mu(R,U) = \sqrt{\frac{1}{s}\sum_{k=1}^{s}(\mu_k - \bar{\mu}_k)^2} \quad (15)$$

$$\mu_k(R_k) = \frac{1}{m}\sum_{j=1}^{m} R_{kj} \quad (16)$$

$$\bar{\mu}_k(R_k, U) = \frac{1}{\bar{m}}\sum_{j=1}^{m} U_j R_{kj} \quad (17)$$

$$\varepsilon_\sigma(R,U) = \sqrt{\frac{1}{s}\sum_{k=1}^{s} w_k(\sigma_k - \bar{\sigma}_k)^2} \quad (18)$$

-continued $$\sigma_k(R_k) = \sqrt{\frac{1}{m}\sum_{j=1}^{m}(\mu_k - R_k)^2} \quad (19)$$

$$\bar{\sigma}_k(R_k, U) = \sqrt{\frac{1}{\bar{m}}\sum_{j=1}^{m}(\bar{\mu}_k - U_j R_k)^2} \quad (20)$$

where: $w_k \in [0 \ 1]$ is a weight factor

Figure 6:
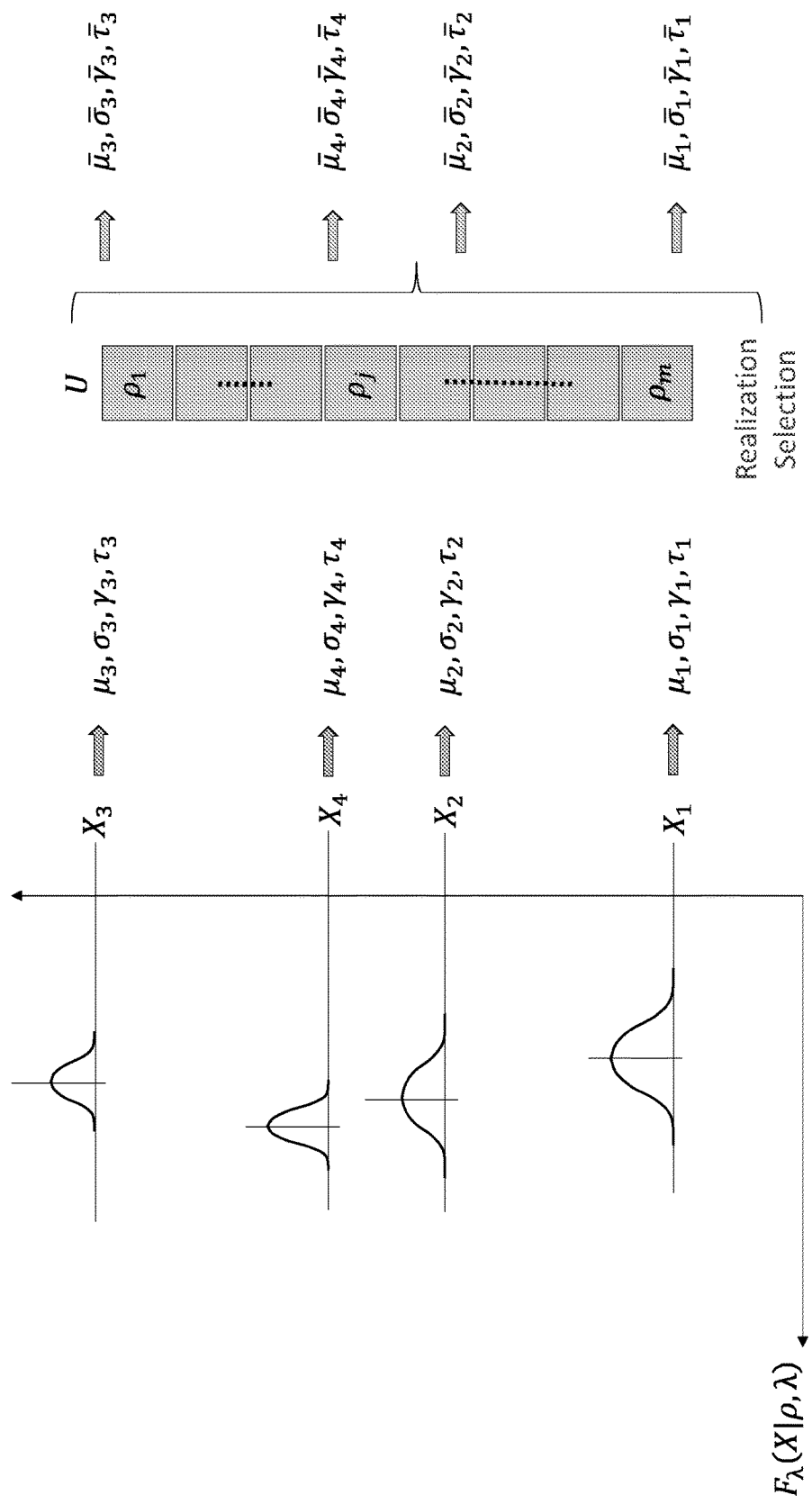
FIG. 6 illustrates an example representation of determining one or more statistical characteristics consistent with embodiments of the present disclosure.

Referring also to FIG. 6 and in some embodiments, simulation optimization process 10 may determine 210 one or more statistical moments (e.g., $\mu_1, \sigma_1, \gamma_1, \tau_1$ for $X_1$; $\mu_2, \sigma_2, \gamma_2, \tau_2$ for $X_2$; $\mu_3, \sigma_3, \gamma_3, \tau_3$ for $X_3$; and $\mu_4, \sigma_4, \gamma_4, \tau_4$ for $X_4$). In some embodiments, $\gamma$ may generally represent skewness (i.e., measure of asymmetry) and r may generally represent kurtosis (i.e., measure of bulginess). As shown in FIG. 6, simulation optimization process 10 may select 204 a subset of realizations, U, and may determine 210 one or more statistical moments associated with the selected subset of realization as described in Equations 17 and 20.

In some embodiments, determining 204 the subset of realizations including the minimal number of realizations from the plurality of subsets of realizations may generally include selecting 214 a first subset of realizations from the plurality of realizations based upon, at least in part, the one or more statistical moments of the simulated reservoir data and a pre-defined number of realizations. For example, with the one or more statistical moments, simulation optimization process 10 may solve Equation 12 to select 212 a first subset of realizations from the plurality of realizations. In some embodiments, $\varepsilon_\mu$ and $\varepsilon_\sigma$ may employ an RMSE measure. However, any suitable measure may be used for selected moments (e.g., Mean error, Max error, SSE, and/or MSE). Accordingly, simulation optimization process 10 may solve Equations 21-24 so as to identify $\hat{U}$, a first subset of realizations from the plurality of subsets of realizations.

$$\underset{U}{\mathrm{argmin}} E(U|D) \quad (21)$$

$$\sum_{j=1}^{m} U_j \geq \bar{m}^L \quad (22)$$

$$\sum_{j=1}^{m} U_j \geq \bar{m}^U \quad (23)$$

$$\sum_{j=1}^{m} U_j = \bar{m} \quad (24)$$

where: $U \in B^m$
$U_j \in \{0,1\}$; and
$j \in [1 \ m]$.

In some embodiments, the constraint of Equation 24 may supersede Equations 22 and 23, if Equations 22 and 23 are defined. In some embodiments and as will be discussed in greater detail below, a sequence of problems may be solved with increasing $\bar{m}$. In this manner, the solution procedure may be adapted based on need given the size of the set of realizations, m. For example, a larger set of realizations, m, may increase the complexity when solving the binary nonlinear problem (e.g., shown below in Equation 25). In some embodiments, upon selecting 212 first subset of realizations from the plurality of subsets of realizations, simulation optimization process 10 may optimize 214 a first set of one or more control variables to achieve the objective using the selected first subset of realizations. For example, using the first subset of realizations selected from the plurality of subsets of realizations, simulation optimization process may solve a reduced problem (e.g., a binary nonlinear problem) as shown in Equation 25 below:

$$\underset{X}{\mathrm{argmax}} M(X \mid \hat{U}, \rho) = M(X \mid \overline{p}) \quad (25)$$

From Equation 25, simulation optimization process 10 may optimize 214 a first set of one or more control variables to achieve the objective using the selected first subset of realizations. In some embodiments, the one or more control variables may include one or more of a well liquid flow rate and an oil flow rate in the reservoir. For example, for a given objective, simulation optimization process 10 may optimize 214 one or more control variables, $\hat{X}$, (e.g., well liquid flow rate, oil flow rate, and/or any control variable that can be tuned) to achieve the objective (e.g., NPV) using the selected first subset of realizations.

In some embodiments, a first partial simulation may be performed 216 on the reservoir data using the optimized first set of one or more control variables on the selected first subset of realizations. Partial may refer to the simulation performed using the optimized one or more control variables with the selected first subset of realizations. In this manner, when the "partial" simulation is run, it runs for the entire simulation period, for each and every realization evaluated (i.e., the selected first subset of realization). Accordingly, simulation optimization process 10 may perform a simulation for the entire simulation period with fewer evaluations (i.e., simulations of individual realizations). For example, an optimal solution may be defined as a partial simulation performed on the reservoir data using the first set of one or more control variables (e.g., first set of one or more optimal control variables $\hat{X}$) on the selected first subset of realizations given as shown in Equation 26:

$$f_m(\hat{X} \mid \hat{U}, \rho) = M(\hat{X} \mid \hat{U}, \rho) \quad (26)$$

In some embodiments, a first full simulation may be performed 218 on the reservoir data using the optimized first set of one or more control variables on the plurality of realizations. For example, simulation optimization process 10 may establish an actual simulation using the full set of realizations. In this manner, the solution from the first partial simulation (e.g., first set of one or more control variables $\hat{X}$) may be evaluated by the full system (e.g., simulation with all realizations) as shown below in Equation 27:

$$F(\hat{X} \mid \rho) \quad (27)$$

In some embodiments, it may be determined 220 whether a mismatch between simulation results associated with the first full simulation and simulation results associated with the first partial simulation are within a predefined threshold. In some embodiments, the predefined threshold may be user-defined. The predefined threshold may be a model error defined according to Equation 28:

$$\epsilon_m = |f_m - F| = \|\hat{M}F\| \quad (28)$$

In some embodiments, when the mismatch is determined 220 to be within the predefined threshold, the number of realizations may be incremented. For example, when the model error falls below a given threshold (e.g., is within a predefined threshold), the predefined number of retained realizations may be incremented 222 and simulation optimization process 10 may repeat as described above. In some embodiments, a solution error may be determined as shown below in Equation 29.

$$\epsilon_s = \|FF_{best}\| \quad (29)$$

Figure 7:
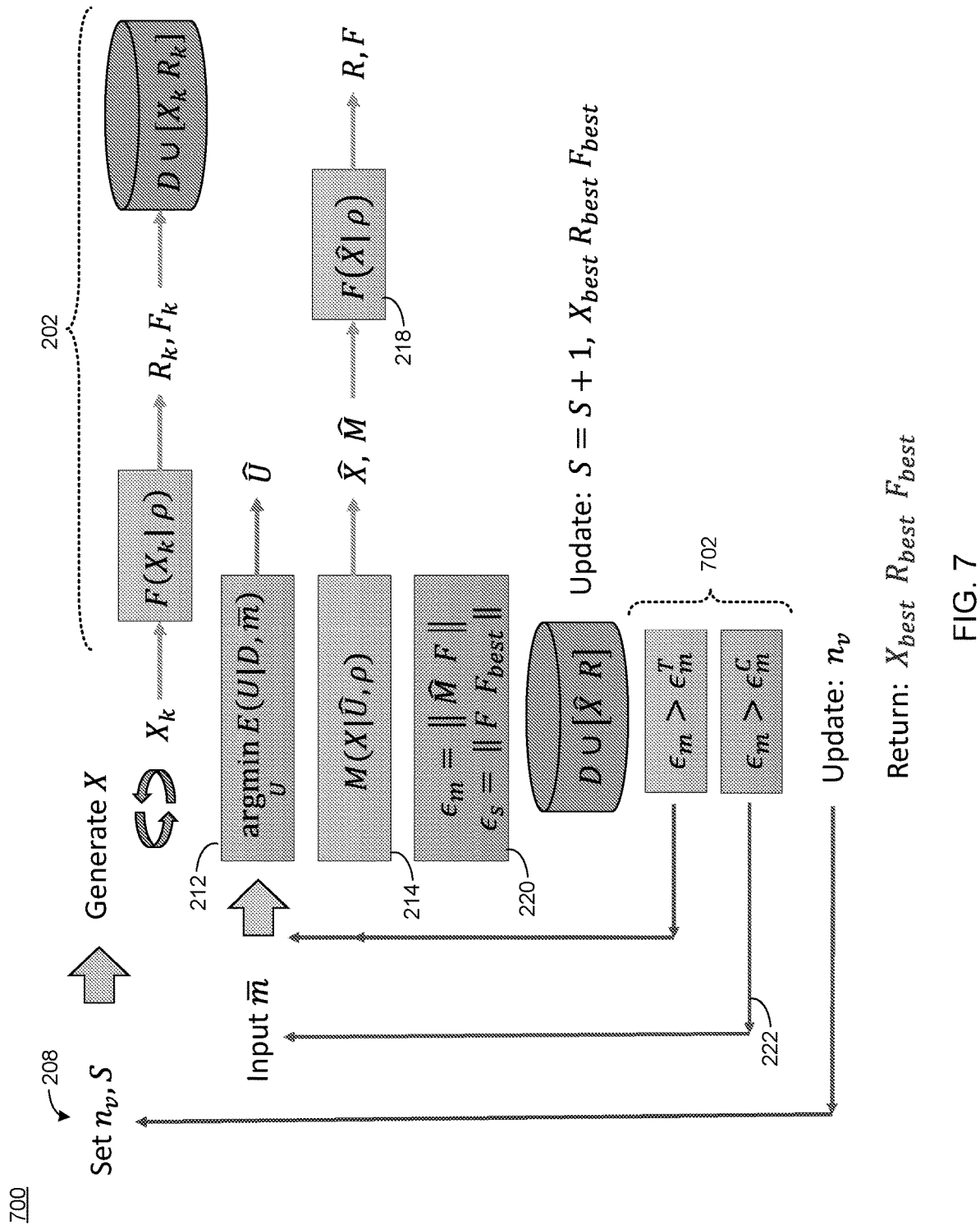
FIGS. 7-8 illustrate a flowchart showing operations consistent with embodiments of the present disclosure.
Figure 8:
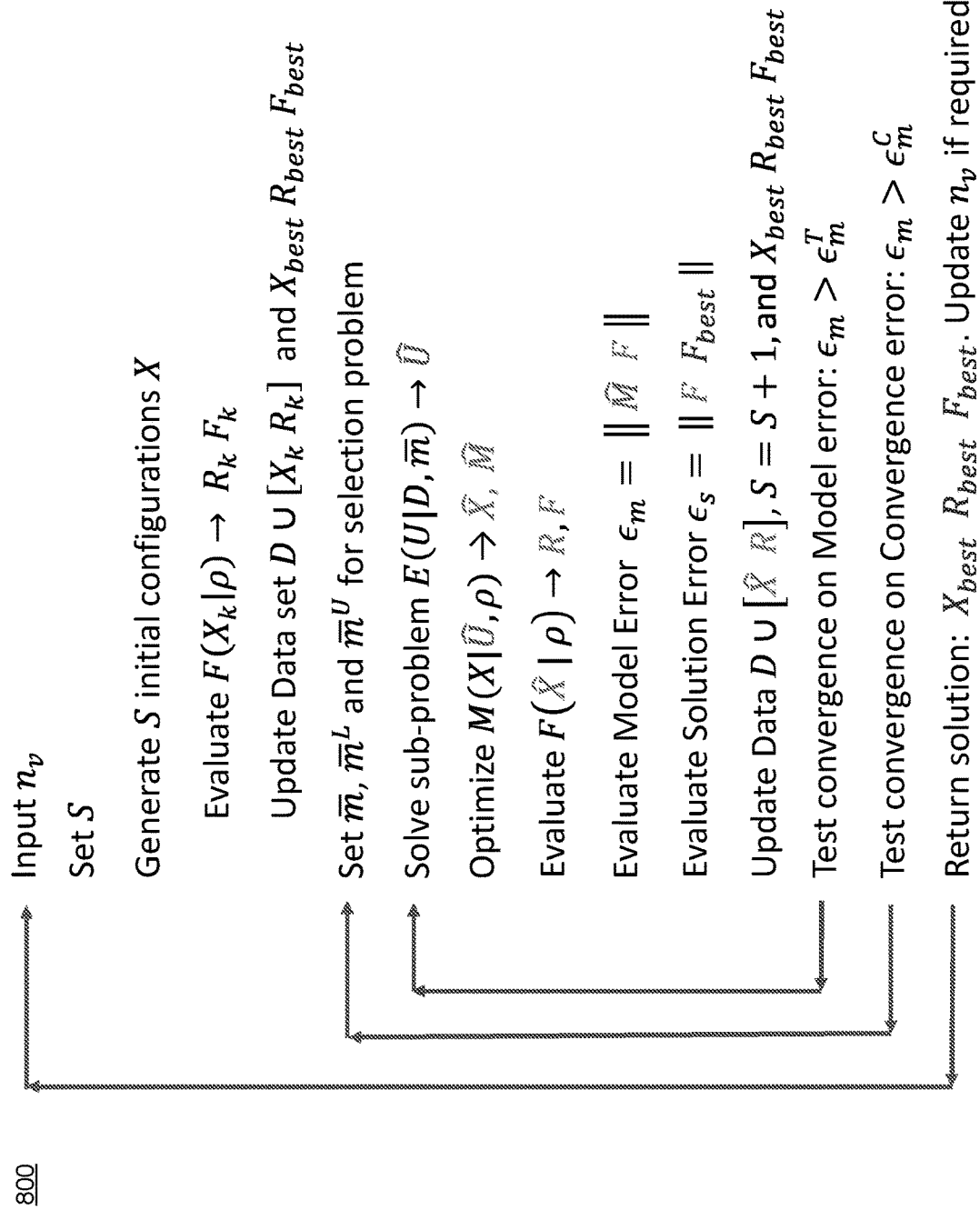

Referring also to FIG. 7, an embodiment depicting an example flowchart for managing uncertainty in reservoir simulation optimization is provided. In some embodiments, simulation optimization process 10 may receive 208 a selection (e.g., from a user or a predefined setting) for a number of temporal partitions, $n_v$, and a number of samples, S. The selection of the number of temporal partitions, $n_v$, will be discussed in greater detail below. Simulation optimization process 10 may perform 202 the simulation on the reservoir data to generate simulated reservoir data. In some embodiments and as discussed above, performing 202 the simulation may generate a simulation response for a set of control variables X for the S randomly selected samples in the search space. In this manner, the full system (e.g., simulation of each sample with each realization of a plurality of realizations) may be evaluated over a given number of samples, S, and the data may be stored in a repository such as those shown in FIG. 1. In some embodiments, simulation optimization process 10 may determine 204 a subset of realizations including a minimal number of realizations from the plurality of subsets of realizations. For example, simulation optimization process 10 may select 212 a first subset of realizations from the plurality of realizations based upon, at least in part, the one or more statistical moments of the simulated reservoir data and a pre-defined number of realizations, $\overline{m}$. In other words, a nonlinear binary optimization sub-problem (e.g., as shown in Equation 21) may be defined and solved to identify the minimal number of realizations necessary to quantify the underlying distribution given by the statistical moments of the known data-set. In some embodiments, simulation optimization process 10 may select 212 first subset of realizations, $\hat{U}$, from a plurality of realizations, $\rho$. It should be noted that this measure is not based on one configuration but a representative collection of samples over the search space (as given by the S samples)

Continuing with the example of FIG. 7, simulation optimization process 10 may optimize 214 a first set of one or more control variables (e.g., first set of one or more control variables $\hat{X}$) to achieve the objective using the selected first subset of realizations as shown in Equation 25. A first partial simulation may be performed 216 on the reservoir data using the optimized first set of one or more control variables on the selected first subset of realizations as shown in Equation 26. In some embodiments, a first full simulation may be performed 218 on the reservoir data using the optimized first set of one or more control variables on the plurality of realizations as shown in Equation 27. In this manner, the reduced problem may be solved first, and then evaluated by the full model comprising all realizations.

In some embodiments, it may be determined 220 whether a mismatch between simulation results associated with the first full simulation and simulation results associated with the first partial simulation are within a predefined threshold as shown in Equation 28. For example, if the model mismatch is not within the given threshold, the desired number of samples in the binary selected problem may be incremented and the process may be repeated. In some embodiments, the above described simulation optimization process 10 may be applied over several iterations and may halt when convergence conditions (e.g., convergence conditions 702) on the known data are met. For example, the accuracy of the first subset of realizations may be determined based upon, at least in part, a convergence on model error as shown in Equation 30 and/or a convergence on convergence error as shown in Equation 31 below:

$$\epsilon_m > \epsilon_m^T \quad (30)$$

$$\epsilon_m > \epsilon_m^C \quad (31)$$

Collectively, embodiments of simulation optimization process 10 may be mathematically consistent and expected to return the anticipated solution from the full problem in the long run (assuming optimality of sub-problems—however, in reality, this cannot be guaranteed).

As discussed above, simulation optimization process 10 may be iterative based upon, at least in part, a model error as shown in Equation 28 and/or convergence conditions as shown in Equations 30-31. For example, and referring also to FIGS. 9-16, an example of simulation optimization process 10 is provided with an objective to maximize NPV in a reservoir with the following parameters:

m=50
$n_p$=11
$n_f$=7
T=20 years
q=0.25 years
$n_v$=5
S=12
$\overline{m}$=4

Figure 9:
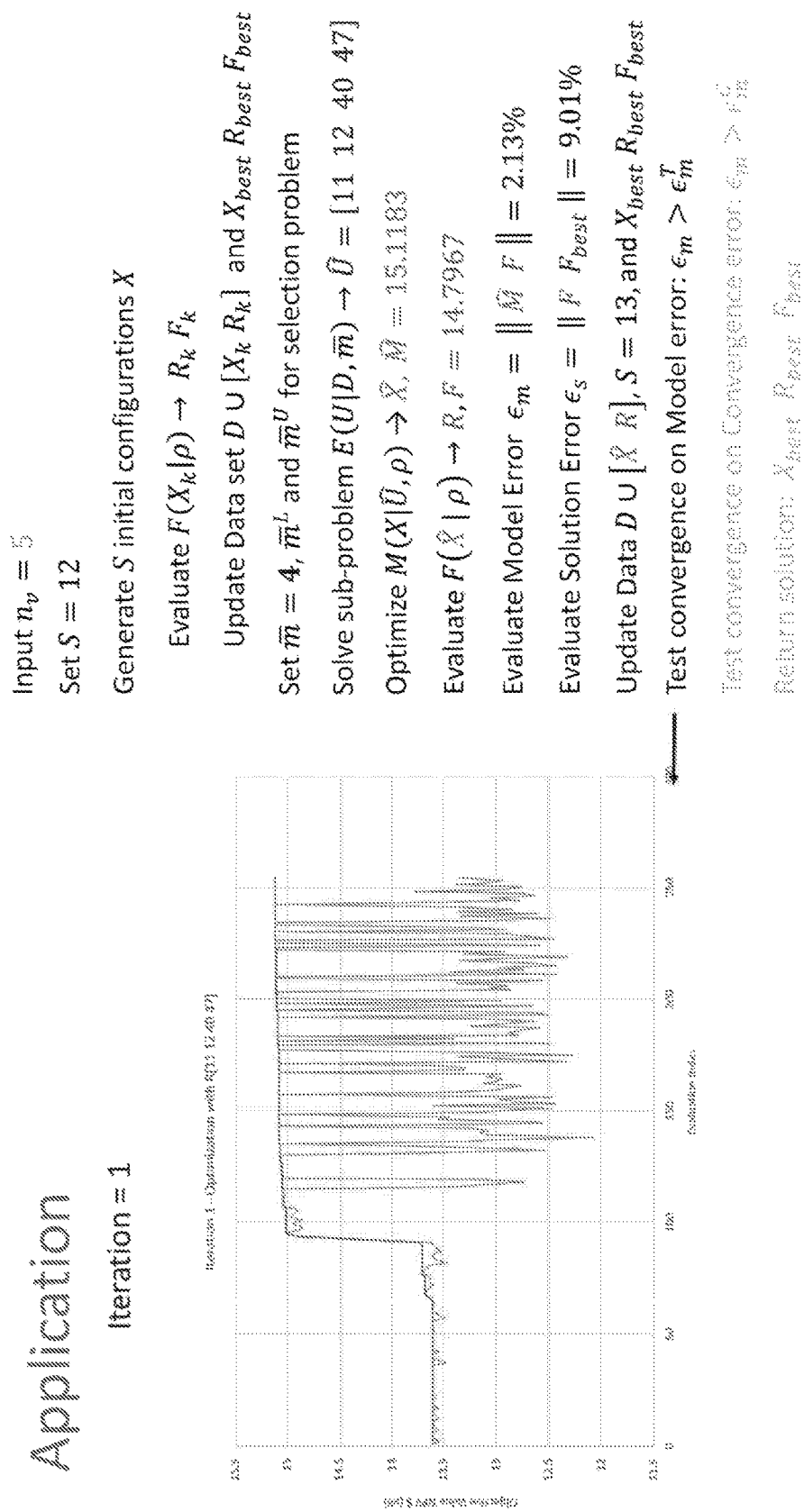

As discussed above and as shown in the example of FIG. 9, a subset of realizations including a minimal number of realizations, $\hat{U}$, may be determined 212 from a plurality of realizations based upon, at least in part, one or more statistical moments of the simulated reservoir data. In the example of FIG. 9, the first subset of realizations, $\hat{U}$, may be determined to be:

$$\hat{U}=[1\;1\;1\;2\;4\;0\;4\;7]$$

As discussed above and in the example of FIG. 9, simulation optimization process 10 may optimize 214 a first set of one or more control variables (e.g., first set of one or more control variables $\hat{X}$) to achieve the objective using the selected first subset of realizations as shown in Equation 25. A first partial simulation may be performed 216 on the reservoir data using the optimized first set of one or more control variables on the selected first subset of realizations as shown in Equation 26. In the example of FIG. 9, simulation optimization process 10 may determine an NPV from the partial simulation of:

$$M(\hat{X}|\hat{U},\rho) \rightarrow \hat{X}, \hat{M}=15.1183$$

In some embodiments, a first full simulation may be performed 218 on the reservoir data using the optimized first set of one or more control variables on the plurality of realizations as shown in Equation 27. In the example of FIG. 9, simulation optimization process 10 may determine an NPV from the partial simulation of:

$$F(\hat{X}|\rho) \rightarrow R, F=14.7967$$

As discussed above, "partial" simulation refers to the simulation of the reservoir data over the entire simulation period using the optimized first set of one or more control variables to produce evaluations of the first subset of realizations (e.g., as opposed to producing evaluations for every realization). In some embodiments, it may be determined 220 whether a mismatch between simulation results associated with the first full simulation and simulation results associated with the first partial simulation are within a predefined threshold as shown in Equation 28. Additionally, a solution error may be determined as shown in Equation 29. In the example of FIG. 9, simulation optimization process 10 may determine a model error and a solution error of:

$$\in_m = |f_M - F| = ||\hat{M}F|| = 2.13\%$$

$$\in_s = ||FF_{best}|| = 9.01\%$$

In some embodiments, simulation optimization process 10 may update data of a repository with the optimized one or more control variables and the results of each simulation. In this example, simulation optimization process 10 may determine that the mismatch between the simulation results associated with the first full simulation and simulation results associated with the first partial simulation are within a predefined threshold. In some embodiments, simulation optimization process 10 may test convergence on model error as shown in Equation 30. In this example, because the model error is greater than the threshold $\in_m^T$, simulation optimization process 10 may determine a second subset of realizations (e.g., a different subset of realizations) with the same number of realizations retained (e.g., $\overline{m}$=4).

Referring also to the example of FIG. 10 and in some embodiments, a second subset of realizations from the plurality of realizations may be selected 224 based upon, at least in part, the one or more statistical moments of the simulated reservoir data and the incremented number of realizations. In the example of FIG. 10, the second subset of realizations, $\hat{U}$, may be determined to be:

$$\hat{U}=[1\;4\;3\;2\;4\;2\;5\;0]$$

As discussed above and in the example of FIG. 10, simulation optimization process 10 may optimize 226 a second set of one or more control variables (e.g., second set of one or more control variables $\hat{X}$) to achieve the objective using the selected second subset of realizations as shown in Equation 25. A second partial simulation may be performed 228 on the reservoir data using the optimized second set of one or more control variables on the selected second subset of realizations as shown in Equation 26. In the example of FIG. 10, simulation optimization process 10 may determine an NPV from the partial simulation of:

$$M(\hat{X}|\hat{U},\rho) \rightarrow \hat{X}, \hat{M}=15.3035$$

In some embodiments, a second full simulation may be performed 230 on the reservoir data using the optimized second set of one or more control variables on the plurality of realizations as shown in Equation 27. In the example of FIG. 10, simulation optimization process 10 may determine an NPV from the partial simulation of:

$$F(\hat{X}|\rho) \rightarrow R, F=15.1807$$

In some embodiments, it may be determined whether a mismatch between simulation results associated with the second full simulation and simulation results associated with the second partial simulation are within a predefined threshold as shown in Equation 28. Additionally, a solution error may be determined as shown in Equation 29. In the example of FIG. 10, simulation optimization process 10 may determine a model error and a solution error of:

$$\in_m = |f_M - F| = ||\hat{M}F|| = 0.80\%$$

$$\in_s = ||FF_{best}|| = 2.60\%$$

In some embodiments, simulation optimization process 10 may update data of a repository with the optimized one or more control variables and the results of each simulation. In this example, simulation optimization process 10 may determine that the mismatch between the simulation results associated with the first full simulation and simulation results associated with the first partial simulation are within a predefined threshold. In some embodiments, simulation optimization process 10 may test convergence on model error as shown in Equation 30. In this example, because the model error is less than the threshold $\in_m^T$, simulation optimization process 10 may determine a third subset of realizations (e.g., a different subset of realizations) with an incremented number of realizations retained in the subset of realizations. Accordingly, simulation optimization process 10 may increment $\overline{m}$=5 and may determine a third subset of realizations with a minimal number of realizations.

Figure 11:
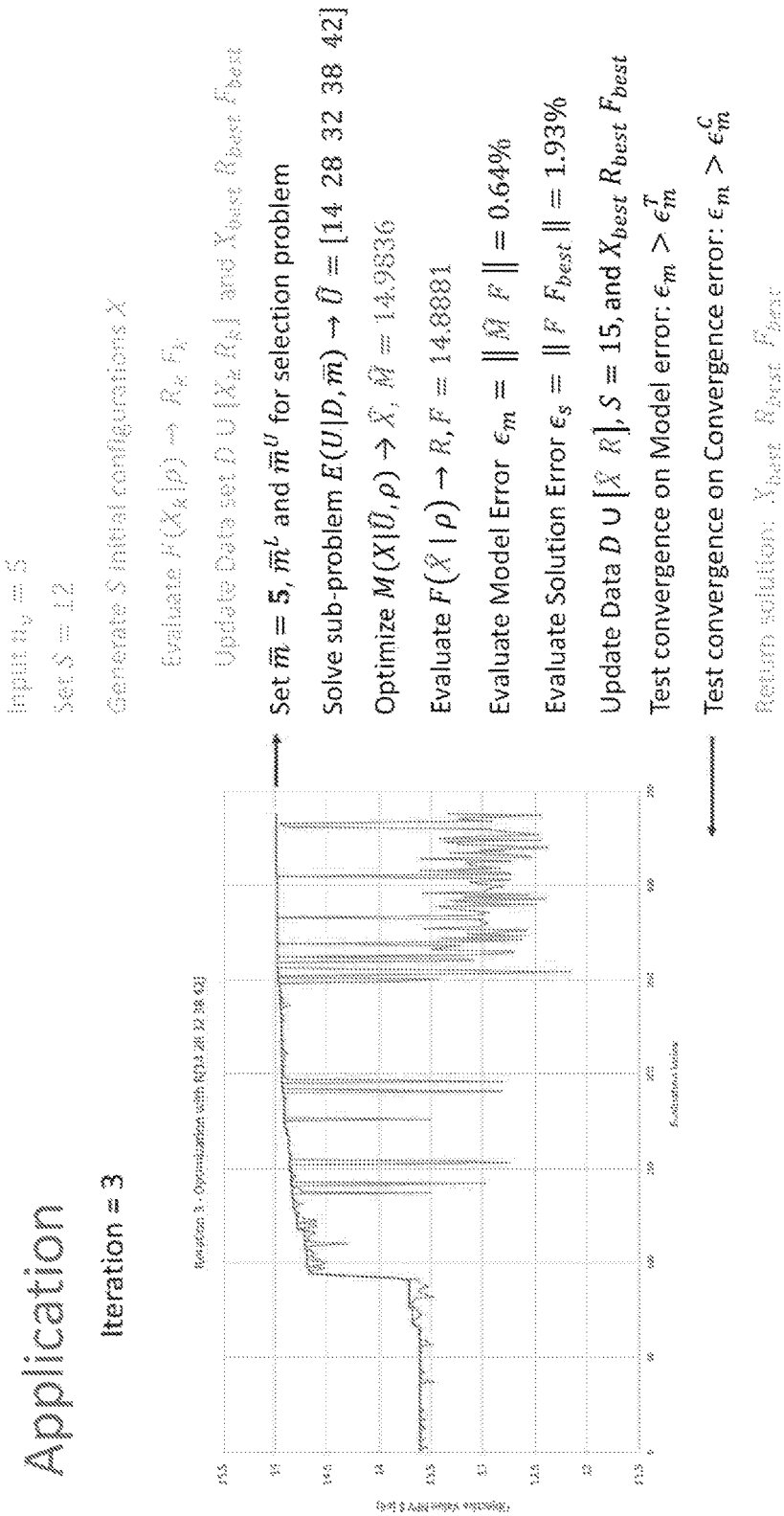
Figure 13:
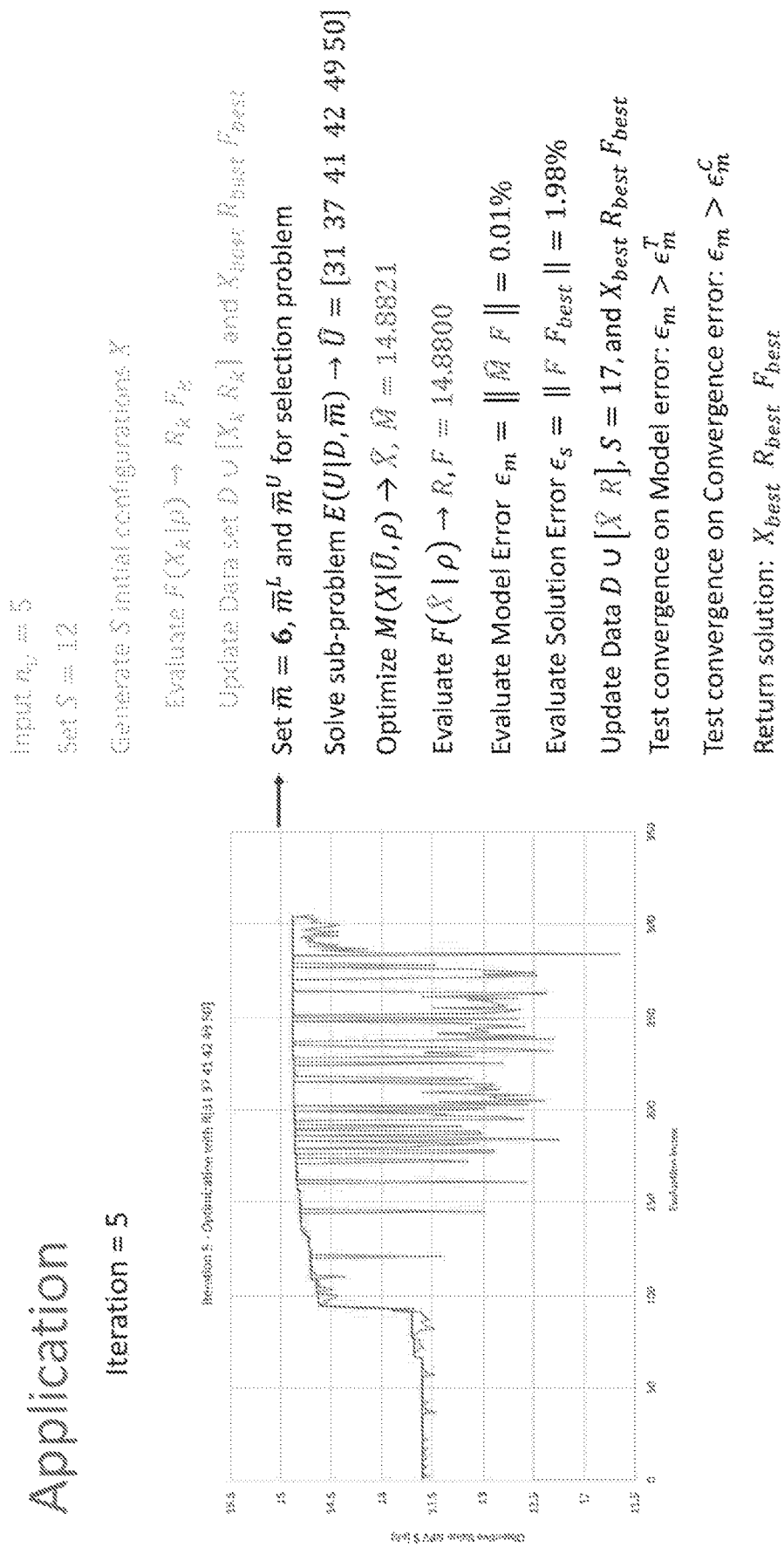
Figure 14:
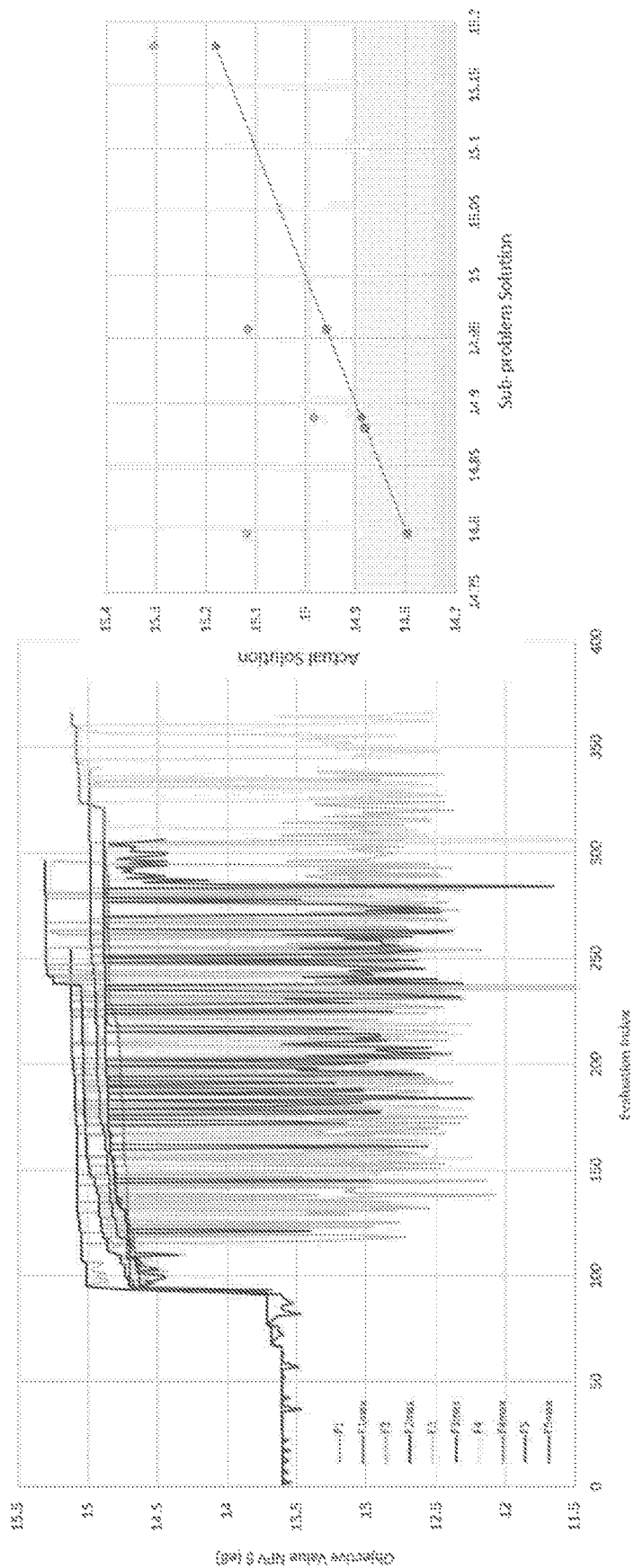
Figure 15:
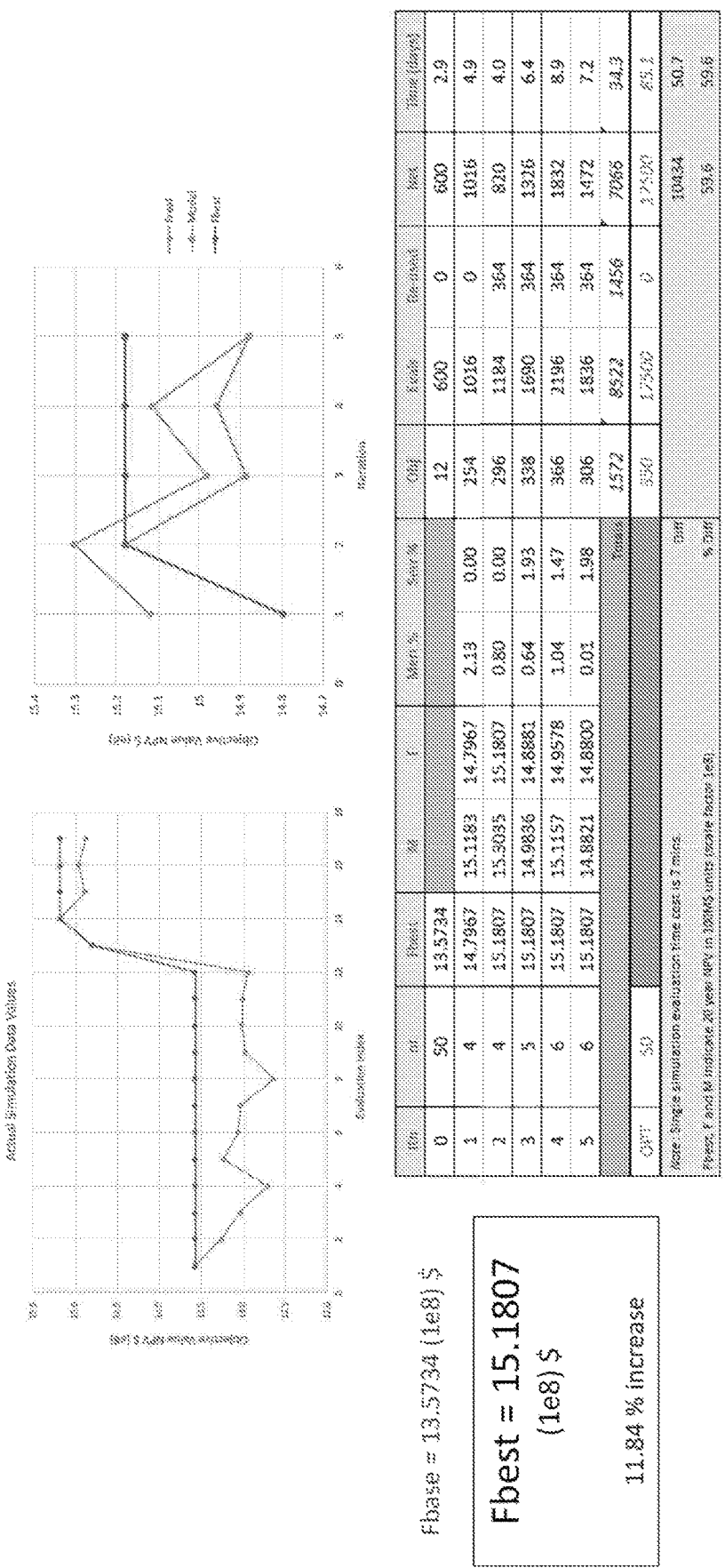

This process may be repeated as shown in the examples of FIGS. 11-13 until a convergence condition is achieved. Referring also to the example of FIG. 13, subset of realizations, $\hat{U}$, may be determined to be:

$$\hat{U}=[3\,13\,7\,41\,42\,49\,50]$$

As discussed above and in the example of FIG. 13, simulation optimization process 10 may optimize the set of one or more control variables (e.g., set of one or more control variables $\hat{X}$) to achieve the objective using the selected second subset of realizations as shown in Equation 25. A partial simulation may be performed on the reservoir data using the optimized second set of one or more control variables on the selected subset of realizations as shown in Equation 26. In the example of FIG. 13, simulation optimization process 10 may determine an NPV from the partial simulation of:

$$M(\hat{X}|\hat{U},\rho) \rightarrow \hat{X}, \hat{M} = 14.8821$$

In some embodiments, a full simulation may be performed on the reservoir data using the optimized set of one or more control variables on the plurality of realizations as shown in Equation 27. In the example of FIG. 13, simulation optimization process 10 may determine an NPV from the partial simulation of:

$$F(\hat{X}|\rho) \rightarrow R, F = 14.8800$$

In some embodiments, it may be determined whether a mismatch between simulation results associated with the full simulation and simulation results associated with the partial simulation are within a predefined threshold as shown in Equation 28. Additionally, a solution error may be determined as shown in Equation 29. In the example of FIG. 13, simulation optimization process 10 may determine a model error and a solution error of:

$$\in_m = |f_M - F| = \|\hat{M}F\| = 0.01\%$$

$$\in_s = \|FF_{best}\| = 1.98\%$$

Accordingly, an optimized reservoir model associated with an objective may be generated 206 based upon, at least in part, the subset of realizations including the minimal number of realizations. In the example of FIGS. 9-13, the optimized one or more control variables, the results of the partial simulation, and the results of the full simulation may be returned as an optimized reservoir model associated with the objective of e.g., maximizing NPV in a reservoir. In the example of FIG. 13, these may be represented by $X_{best}$, $R_{best}$, $F_{best}$. These results are summarized in FIGS. 14-16.

Figure 16:
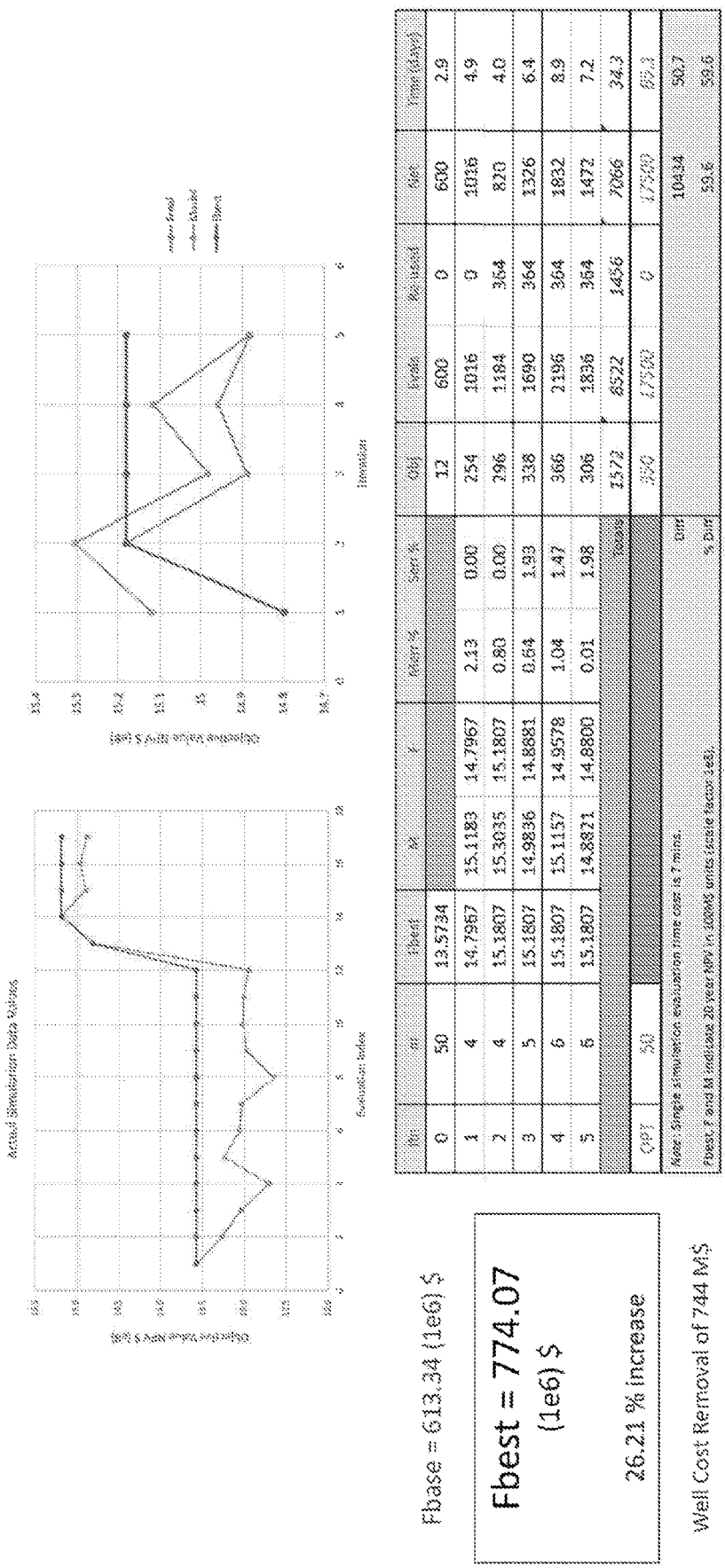
Figure 18:
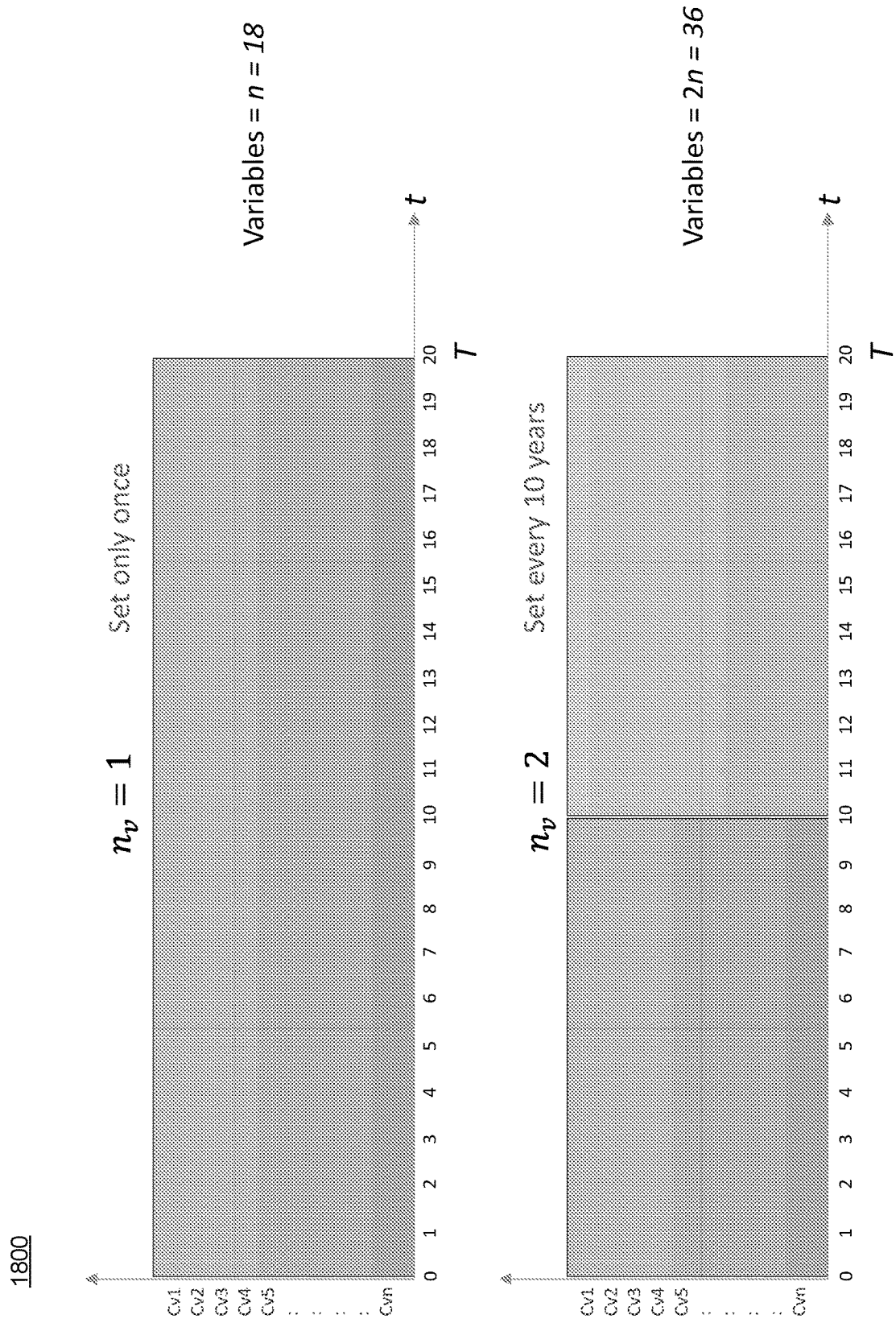
FIGS. 18-23 illustrate various numbers of temporal partitions consistent with embodiments of the present disclosure.
Figure 19:
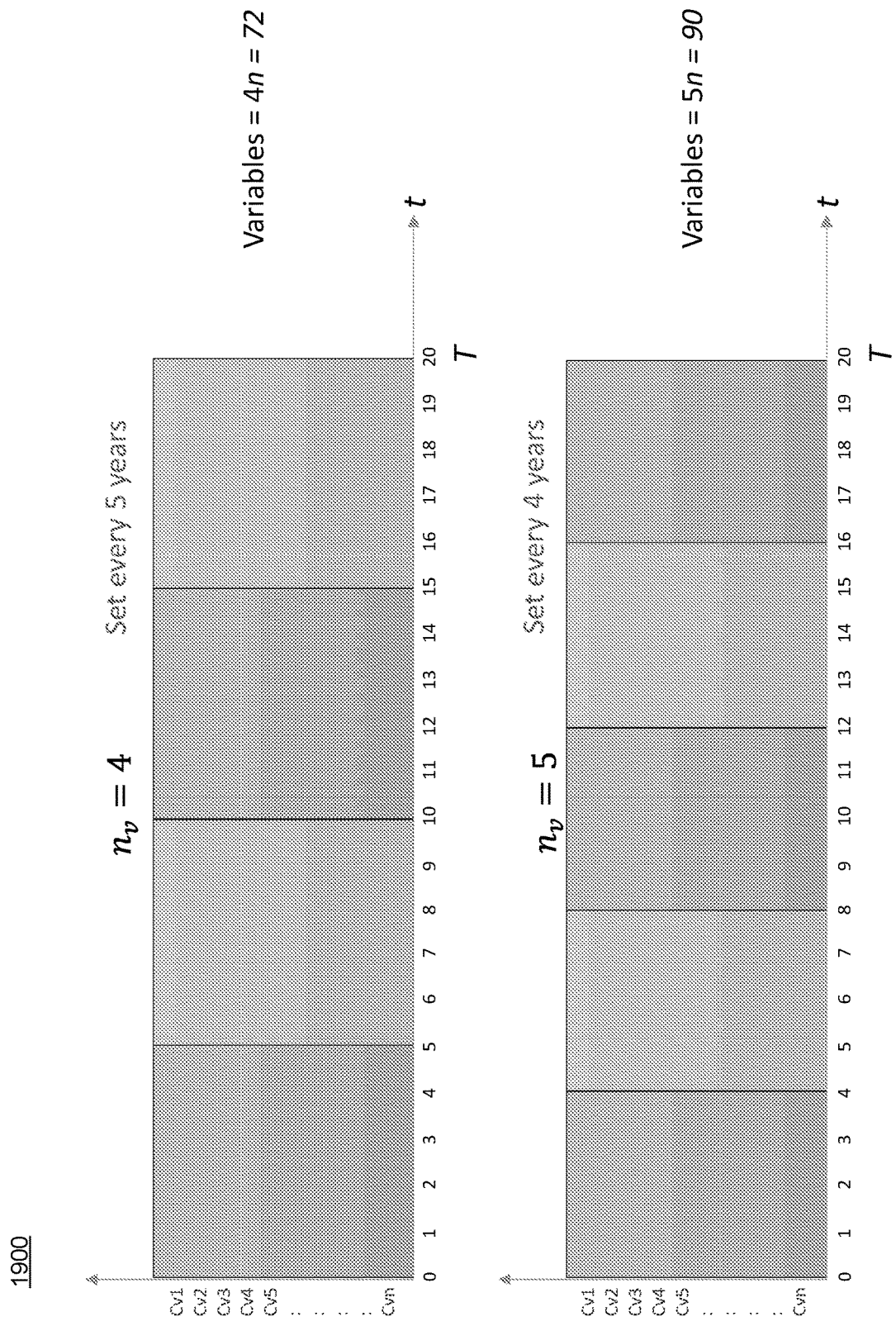
Figure 20:
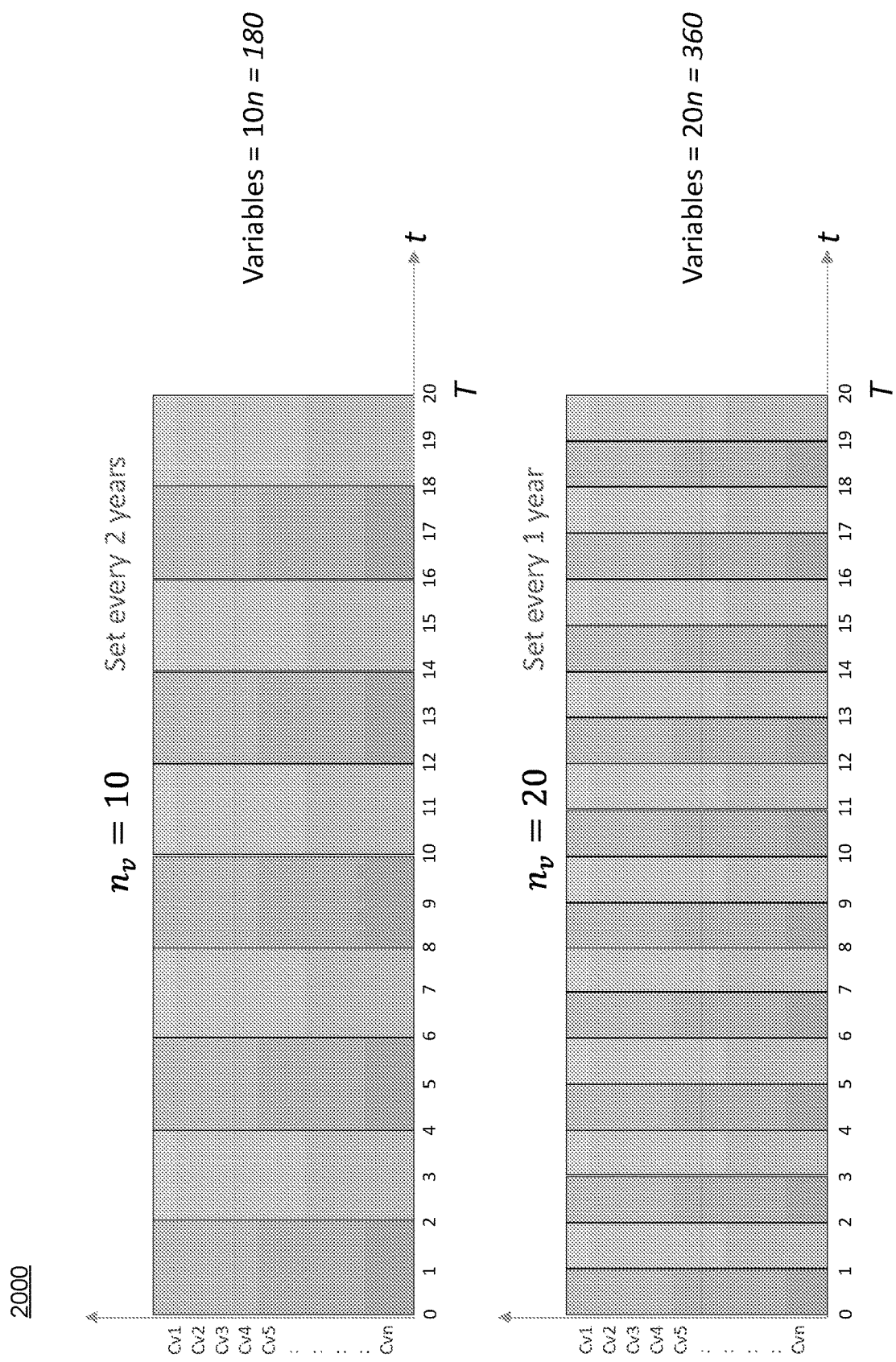
Figure 21:
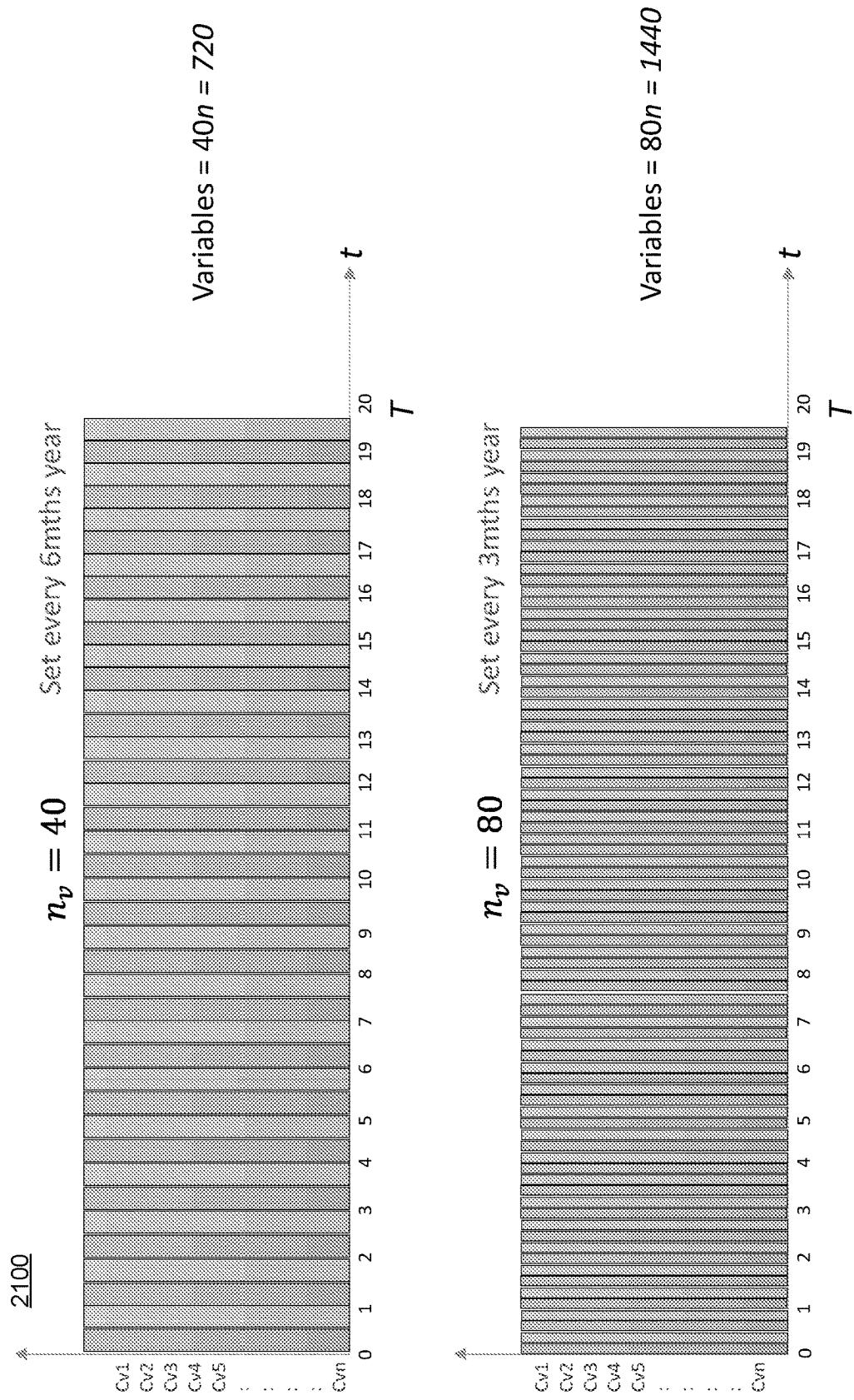
Figure 22:
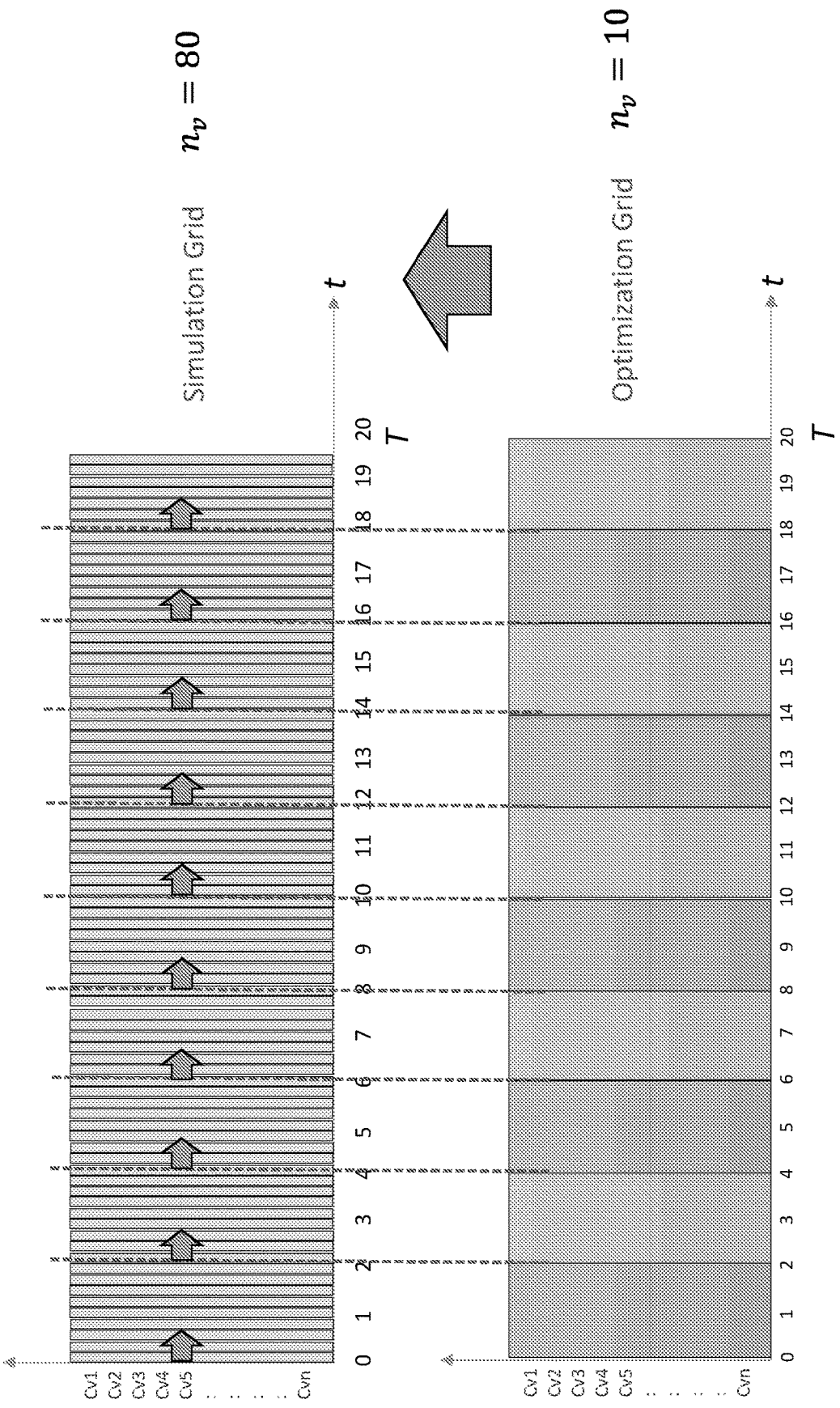
Figure 23:
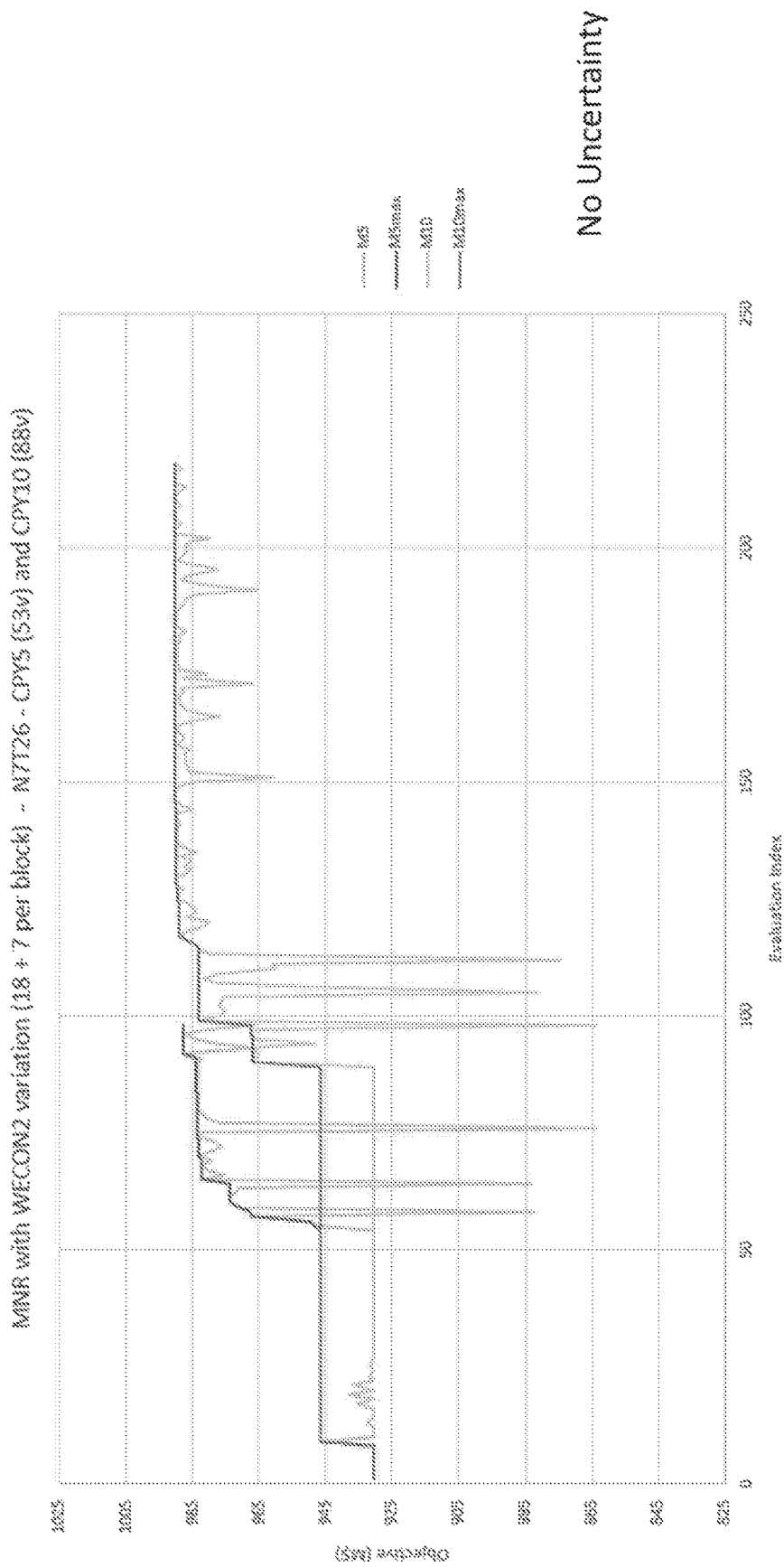

Referring also to the example of FIG. 16, with just five iterations requiring only 7,066 evaluations for a computing device, an optimized reservoir model associated with an objective (e.g., maximizing NPV for the example of FIG. 16) may be generated 206. By contrast, the conventional simulation approach as discussed above would require 17,500 evaluations. With a 59.6% increase in efficiency, it will be appreciated that embodiments of the present disclosure may provide a more efficient process for generating optimized reservoir models on a computing device. While the example of FIG. 16 includes generating 206 the optimized reservoir model associated with an objective using a single computing device configured to perform each evaluation sequentially, it will be appreciated that simulation optimization process 10 may generate 206 the optimized reservoir model using multiple computing devices and/or processors. For example, and in some embodiments, simulation optimization process 10 may perform via parallel computing to reduce the amount of time required to compute the number of evaluations (e.g., 7,066 evaluations from the example of FIG. 16).

In some embodiments, the optimized reservoir model may be used 232 to alter one or more operations at the reservoir. As discussed above, the optimized reservoir model generated by embodiments of the present disclosure may optimize one or more control variables associated with the operation of a reservoir. For example, the optimized one or more control variables may relate to well liquid rate flow and/or oil rate flow. Accordingly, the optimized reservoir model may be used 232 to alter one or more operations at the reservoir to achieve the objective of the simulations. As discussed above and in the example of FIGS. 9-16, the optimized one or more control variables may be determined more efficiently than with conventional approaches. As such, the efficiency of the reservoir may be enhanced to achieve a particular objective.

In summary, embodiments included herein may provide a computationally efficient means to optimize an expensive reservoir simulation model under geological uncertainty. Note that the method described is embodied in the form of a simulation-optimization prototype and can assist in significantly reducing the cost associated in obtaining a solution. The scheme, as per the original problem, may also benefit from the use of parallel evaluations (where possible) using for example multi-core high-performance computing facilities, as available, to make all independent evaluations in a given step of the procedure in parallel as required.

Referring also to FIGS. 17-23 and in some embodiments, simulations may be performed with a number of time periods or temporal partitions, $n_t$, set or determined by simulation optimization process 10. In some embodiments, the number of temporal partitions may be set to five. In this example, this number of temporal partitions may relate to partitions covering four-year segments. However, it will be appreciated that other numbers of temporal partitions are possible within the scope of the present disclosure. As shown in FIG. 17, numerous variables may be included during simulation of a reservoir and as shown in FIGS. 18-23, the selection of the temporal partitions may impact the number of variables in the simulation. For example, and in some embodiments, the greater the number of partitions, the greater the model refinement and control. Moreover, the greater the number of partitions, the greater the number of variables in the optimization problem. In some cases, the optimization problem may be too unwieldy with fine granularity (too many variables). In this way, increasing partitions will improve optimization performance. Some embodiments may require the least number of partitions with the best compromise between computational effort and the anticipated result.

Embodiments of simulation optimization process 10 may present a means to optimize an expensive reservoir simulation model under geological uncertainty efficiently. Embodiments may allow for removal of redundant or less impactful realizations and may mitigate computational effort for each objective realization. The process may provide a significant reduction in total simulation evaluation cost and allow a good solution to be obtained in a computationally efficient manner. The results of the optimized reservoir simulation model may be used to alter and change actual in-field operations. Ultimately, the solution established (the best-known record in the repository) may not change appreciably and the convergence test may halt the entire procedure.

In some embodiments, the teachings of the present disclosure may be applied to the selection of geological realizations as part of reservoir simulation. However, the approach may be applicable to any uncertainty-based workflow that is described by a set of discrete realizations (and be considered in conjunction with any continuous uncertain parameters). These realizations could be geological realizations of the reservoir, or some other artifact based on gathered data (after processing or in real-time, from a tool, for example). The procedure serves to optimize the system under this set of discrete realizations in an efficient manner. For reservoir simulation this may include establishing the optimal flowrates in the well to maximize some long-term objective, such as the net present value (NPV) over many years. For some other system, it may provide the means to anticipate the impact of a set of discrete realizations in an expedient manner, where the objective is the goal of the intended system.

It should be noted that while the estimates of mean and variance can be evaluated and used directly, it may be easier to capture statistical properties for higher moments by way of distributions (PDF, CDF, etc.). Thus, the error function would be the mismatch between the observed distribution and the approximated one, based on the set of reduced realizations selected during the nonlinear binary optimization sub-problem step.

In some embodiments, for reservoir simulation (as discussed herein), the processing may be performed offline on a computer system comprising a reservoir simulation model. However, depending on the problem, and how quickly the set of discrete realizations are established, it could be applied to one or more systems working in real-time (or near real-time) closer to the field. The main development is a means to manage uncertainty represented by a discrete set of possibilities (geological realizations or other) and does not preclude the presence of continuous uncertain parameters (that are sampled by distributions according to need).

The flowchart and block diagrams in the figures illustrate the architecture, functionality, and operation of possible implementations of systems and methods and according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A computer-implemented method for optimizing a reservoir simulation corresponding to a reservoir, the method comprising:
receiving, using one or more processors, reservoir data associated with the reservoir;
performing a simulation on the reservoir data to generate simulated reservoir data;
determining a subset of realizations including a minimal number of realizations from a plurality of realizations based upon, at least in part, one or more statistical moments of the simulated reservoir data, wherein determining the subset of realizations including the minimal number of realizations from the plurality of subsets of realizations includes:
selecting a first subset of realizations from the plurality of realizations based upon, at least in part, the one or more statistical moments of the simulated reservoir data and a pre-defined number of realizations;
optimizing a first set of one or more control variables to achieve an objective using the selected first subset of realizations, wherein the one or more control variables include one or more of a well liquid flow rate and an oil flow rate in the reservoir;

performing a first partial simulation on the reservoir data using the optimized first set of one or more control variables on the generated first subset of realizations; and performing a first full simulation on the reservoir data using the optimized first set of one or more control variables on the plurality of realizations; and generating an optimized reservoir model associated with the objective based upon, at least in part, the subset of realizations including the minimal number of realizations and using the optimized reservoir model to alter one or more operations at the reservoir.

2. The computer-implemented method of claim 1, further comprising:

determining whether a mismatch between simulation results associated with the first full simulation and simulation results associated with the first partial simulation are within a predefined threshold;

when the mismatch is determined to be within the predefined threshold:
 a) incrementing the number of realizations;
 b) selecting a second subset of realizations from the plurality of realizations based upon, at least in part, the one or more statistical moments of the simulated reservoir data and the incremented number of realizations;
 c) optimizing the second set of one or more control variables for the simulation of the reservoir data using the selected second subset of realizations;
 d) performing a second partial simulation on the reservoir data using the optimized second set of one or more control variables on the selected second subset of realizations;
 e) performing a second full simulation on the reservoir data using the optimized second set of one or more control variables and the plurality of realizations; and
 f) repeating actions a) through e) until a convergence condition is achieved.

3. The computer-implemented method of claim 1, further comprising:

selecting a plurality of random samples to simulate;

performing the simulation on the reservoir data to generate the simulated reservoir data based upon, at least in part, the plurality of random samples; and determining the one or more statistical moments of the simulated reservoir data.

4. The computer-implemented method of claim 1, wherein the one or more statistical moments of the simulated reservoir data include one or more of a mean, a variance, and a standard deviation.

5. A computer program product residing on a non-transitory computer readable medium having a plurality of instructions stored thereon which, when executed by a processor, cause the processor to perform operations comprising:

receiving reservoir data associated with a reservoir;

performing a simulation on the reservoir data to generate simulated reservoir data;

determining a subset of realizations including a minimal number of realizations from a plurality of realizations based upon, at least in part, one or more statistical moments of the simulated reservoir data, wherein determining the subset of realizations including the minimal number of realizations from the plurality of subsets of realizations includes:

selecting a first subset of realizations from the plurality of realizations based upon, at least in part, the one or more statistical moments of the simulated reservoir data and a pre-defined number of realizations;

optimizing a first set of one or more control variables to achieve an objective using the selected first subset of realizations, wherein the one or more control variables include one or more of a well liquid flow rate and an oil flow rate in the reservoir;

performing a first partial simulation on the reservoir data using the optimized first set of one or more control variables on the generated first subset of realizations; and performing a first full simulation on the reservoir data using the optimized first set of one or more control variables on the plurality of realizations; and generating an optimized reservoir model associated with the objective based upon, at least in part, the subset of realizations including the minimal number of realizations and using the optimized reservoir model to alter one or more operations at the reservoir.

6. The computer program product of claim 5, further comprising instructions configured to cause the processor to perform operations comprising:

determining whether a mismatch between simulation results associated with the first full simulation and simulation results associated with the first partial simulation are within a predefined threshold;

when the mismatch is determined to be within the predefined threshold:
 a) incrementing the number of realizations;
 b) selecting a second subset of realizations from the plurality of realizations based upon, at least in part, the one or more statistical moments of the simulated reservoir data and the incremented number of realizations;
 c) optimizing the second set of one or more control variables for the simulation of the reservoir data using the selected second subset of realizations;
 d) performing a second partial simulation on the reservoir data using the optimized second set of one or more control variables on the selected second subset of realizations;
 e) performing a second full simulation on the reservoir data using the optimized second set of one or more control variables and the plurality of realizations; and
 f) repeating actions a) through e) until a convergence condition is achieved.

7. The computer program product of claim 5, further comprising instructions configured to cause the processor to perform operations comprising:

selecting a plurality of random samples to simulate;

performing the simulation on the reservoir data to generate the simulated reservoir data based upon, at least in part, the plurality of random samples; and determining the one or more statistical moments of the simulated reservoir data.

8. The computer program product of claim 5, wherein the one or more statistical moments of the simulated reservoir data include one or more of a mean, a variance, and a standard deviation.

9. A computing system including one or more processors and one or more memories configured to perform operations comprising:

receiving reservoir data associated with a reservoir;

performing a simulation on the reservoir data to generate simulated reservoir data;

determining a subset of realizations including a minimal number of realizations from a plurality of realizations based upon, at least in part, one or more statistical moments of the simulated reservoir data, wherein determining the subset of realizations including the minimal number of realizations from the plurality of subsets of realizations includes:

selecting a first subset of realizations from the plurality of realizations based upon, at least in part, the one or more statistical moments of the simulated reservoir data and a pre-defined number of realizations;

optimizing a first set of one or more control variables to achieve an objective using the selected first subset of realizations, wherein the one or more control variables include one or more of a well liquid flow rate and an oil flow rate in the reservoir;

performing a first partial simulation on the reservoir data using the optimized first set of one or more control variables on the generated first subset of realizations; and performing a first full simulation on the reservoir data using the optimized first set of one or more control variables on the plurality of realizations; and generating an optimized reservoir model associated with the objective based upon, at least in part, the subset of realizations including the minimal number of realizations and using the optimized reservoir model to alter one or more operations at the reservoir.

10. The computing system of claim 9, further configured to perform operations comprising:

determining whether a mismatch between simulation results associated with the first full simulation and simulation results associated with the first partial simulation are within a predefined threshold;

when the mismatch is determined to be within the predefined threshold:
a) incrementing the number of realizations;
b) selecting a second subset of realizations from the plurality of realizations based upon, at least in part, the one or more statistical moments of the simulated reservoir data and the incremented number of realizations;
c) optimizing the second set of one or more control variables for the simulation of the reservoir data using the selected second subset of realizations;
d) performing a second partial simulation on the reservoir data using the optimized second set of one or more control variables on the selected second subset of realizations;
e) performing a second full simulation on the reservoir data using the optimized second set of one or more control variables and the plurality of realizations; and
f) repeating actions a) through e) until a convergence condition is achieved.

11. The computing system of claim 9, further configured to perform operations comprising:

selecting a plurality of random samples to simulate;

performing the simulation on the reservoir data to generate the simulated reservoir data based upon, at least in part, the plurality of random samples; and determining the one or more statistical moments of the simulated reservoir data.

* * * * *